(12) United States Patent
Moore et al.

(10) Patent No.: US 8,775,442 B2
(45) Date of Patent: Jul. 8, 2014

(54) SEMANTIC SEARCH USING A SINGLE-SOURCE SEMANTIC MODEL

(75) Inventors: Jennifer Lauren Moore, Santa Cruz, CA (US); Devang K. Naik, San Jose, CA (US); Jerome R. Bellegarda, Saratoga, CA (US); Kevin Bartlett Aitken, Cupertino, CA (US); Kim E. Silverman, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/472,270

(22) Filed: May 15, 2012

(65) Prior Publication Data
US 2013/0311487 A1  Nov. 21, 2013

(51) Int. Cl.
*G06F 17/30* (2006.01)
*G06F 17/27* (2006.01)

(52) U.S. Cl.
CPC .................... *G06F 17/2785* (2013.01)
USPC ........... 707/749; 707/752; 707/736; 707/724; 707/729

(58) Field of Classification Search
CPC .................................................. G06F 17/2785
USPC .................... 707/752, 736, 724, 729, 749
See application file for complete search history.

(56) References Cited

U.S. PATENT DOCUMENTS

| | | |
|---|---|---|
| 3,704,345 A | 11/1972 | Coker et al. |
| 3,828,132 A | 8/1974 | Flanagan et al. |
| 3,979,557 A | 9/1976 | Schulman et al. |
| 4,278,838 A | 7/1981 | Antonov |
| 4,282,405 A | 8/1981 | Taguchi |
| 4,310,721 A | 1/1982 | Manley et al. |
| 4,348,553 A | 9/1982 | Baker et al. |
| 4,653,021 A | 3/1987 | Takagi |
| 4,688,195 A | 8/1987 | Thompson et al. |
| 4,692,941 A | 9/1987 | Jacks et al. |
| 4,718,094 A | 1/1988 | Bahl et al. |
| 4,724,542 A | 2/1988 | Williford |
| 4,726,065 A | 2/1988 | Froessl |
| 4,727,354 A | 2/1988 | Lindsay |

(Continued)

FOREIGN PATENT DOCUMENTS

| | | |
|---|---|---|
| CH | 681573 A5 | 4/1993 |
| DE | 3837590 A1 | 5/1990 |

(Continued)

OTHER PUBLICATIONS

Bruce Hendrickson, "Latent Semantic Analysis and Fiedler Retrieval". Discrete Algorithms and Mathematics Department, Sandia National Labs, Albuquerque, NM. Sep. 21, 2006.

(Continued)

*Primary Examiner* — Shahid Alam
*Assistant Examiner* — Nargis Sultana
(74) *Attorney, Agent, or Firm* — Morrison & Foerster LLP

(57) ABSTRACT

Techniques for providing semantic search of a data store are disclosed. A similarity metric of a document comprising the data store to a concept represented in a semantic model derived at least in part from a reference source that includes content not included in the data store is determined. A relevance metric of a search query to the concept is computed. The similarity metric and the relevance metric are used to determine, at least in part, a ranking of the document with respect to the search query.

18 Claims, 4 Drawing Sheets

(56) References Cited

U.S. PATENT DOCUMENTS

| | | |
|---|---|---|
| 4,776,016 A | 10/1988 | Hansen |
| 4,783,807 A | 11/1988 | Marley |
| 4,811,243 A | 3/1989 | Racine |
| 4,819,271 A | 4/1989 | Bahl et al. |
| 4,827,520 A | 5/1989 | Zeinstra |
| 4,829,576 A | 5/1989 | Porter |
| 4,833,712 A | 5/1989 | Bahl et al. |
| 4,839,853 A | 6/1989 | Deerwester et al. |
| 4,852,168 A | 7/1989 | Sprague |
| 4,862,504 A | 8/1989 | Nomura |
| 4,878,230 A | 10/1989 | Murakami et al. |
| 4,903,305 A | 2/1990 | Gillick et al. |
| 4,905,163 A | 2/1990 | Garber et al. |
| 4,914,586 A | 4/1990 | Swinehart et al. |
| 4,914,590 A | 4/1990 | Loatman et al. |
| 4,944,013 A | 7/1990 | Gouvianakis et al. |
| 4,955,047 A | 9/1990 | Morganstein et al. |
| 4,965,763 A | 10/1990 | Zamora |
| 4,974,191 A | 11/1990 | Amirghodsi et al. |
| 4,977,598 A | 12/1990 | Doddington et al. |
| 4,992,972 A | 2/1991 | Brooks et al. |
| 5,010,574 A | 4/1991 | Wang |
| 5,020,112 A | 5/1991 | Chou |
| 5,021,971 A | 6/1991 | Lindsay |
| 5,022,081 A | 6/1991 | Hirose et al. |
| 5,027,406 A | 6/1991 | Roberts et al. |
| 5,031,217 A | 7/1991 | Nishimura |
| 5,032,989 A | 7/1991 | Tornetta |
| 5,040,218 A | 8/1991 | Vitale et al. |
| 5,047,614 A | 9/1991 | Bianco |
| 5,057,915 A | 10/1991 | Kohorn et al. |
| 5,072,452 A | 12/1991 | Brown et al. |
| 5,091,945 A | 2/1992 | Kleijn |
| 5,127,053 A | 6/1992 | Koch |
| 5,127,055 A | 6/1992 | Larkey |
| 5,128,672 A | 7/1992 | Kaehler |
| 5,133,011 A | 7/1992 | McKiel, Jr. |
| 5,142,584 A | 8/1992 | Ozawa |
| 5,164,900 A | 11/1992 | Bernath |
| 5,165,007 A | 11/1992 | Bahl et al. |
| 5,179,652 A | 1/1993 | Rozmanith et al. |
| 5,194,950 A | 3/1993 | Murakami et al. |
| 5,197,005 A | 3/1993 | Shwartz et al. |
| 5,199,077 A | 3/1993 | Wilcox et al. |
| 5,202,952 A | 4/1993 | Gillick et al. |
| 5,208,862 A | 5/1993 | Ozawa |
| 5,216,747 A | 6/1993 | Hardwick et al. |
| 5,220,639 A | 6/1993 | Lee |
| 5,220,657 A | 6/1993 | Bly et al. |
| 5,222,146 A | 6/1993 | Bahl et al. |
| 5,230,036 A | 7/1993 | Akamine et al. |
| 5,235,680 A | 8/1993 | Bijnagte |
| 5,267,345 A | 11/1993 | Brown et al. |
| 5,268,990 A | 12/1993 | Cohen et al. |
| 5,282,265 A | 1/1994 | Rohra Suda et al. |
| RE34,562 E | 3/1994 | Murakami et al. |
| 5,291,286 A | 3/1994 | Murakami et al. |
| 5,293,448 A | 3/1994 | Honda |
| 5,293,452 A | 3/1994 | Picone et al. |
| 5,297,170 A | 3/1994 | Eyuboglu et al. |
| 5,301,109 A | 4/1994 | Landauer et al. |
| 5,303,406 A | 4/1994 | Hansen et al. |
| 5,309,359 A | 5/1994 | Katz et al. |
| 5,317,507 A | 5/1994 | Gallant |
| 5,317,647 A | 5/1994 | Pagallo |
| 5,325,297 A | 6/1994 | Bird et al. |
| 5,325,298 A | 6/1994 | Gallant |
| 5,327,498 A | 7/1994 | Hamon |
| 5,333,236 A | 7/1994 | Bahl et al. |
| 5,333,275 A | 7/1994 | Wheatley et al. |
| 5,345,536 A | 9/1994 | Hoshimi et al. |
| 5,349,645 A | 9/1994 | Zhao |
| 5,353,377 A | 10/1994 | Kuroda et al. |
| 5,377,301 A | 12/1994 | Rosenberg et al. |
| 5,384,892 A | 1/1995 | Strong |
| 5,384,893 A | 1/1995 | Hutchins |
| 5,386,494 A | 1/1995 | White |
| 5,386,556 A | 1/1995 | Hedin et al. |
| 5,390,279 A | 2/1995 | Strong |
| 5,396,625 A | 3/1995 | Parkes |
| 5,400,434 A | 3/1995 | Pearson |
| 5,404,295 A | 4/1995 | Katz et al. |
| 5,412,756 A | 5/1995 | Bauman et al. |
| 5,412,804 A | 5/1995 | Krishna |
| 5,412,806 A | 5/1995 | Du et al. |
| 5,418,951 A | 5/1995 | Damashek |
| 5,424,947 A | 6/1995 | Nagao et al. |
| 5,434,777 A | 7/1995 | Luciw |
| 5,444,823 A | 8/1995 | Nguyen |
| 5,455,888 A | 10/1995 | Iyengar et al. |
| 5,469,529 A | 11/1995 | Bimbot et al. |
| 5,471,611 A | 11/1995 | McGregor |
| 5,475,587 A | 12/1995 | Anick et al. |
| 5,479,488 A | 12/1995 | Lennig et al. |
| 5,491,772 A | 2/1996 | Hardwick et al. |
| 5,493,677 A | 2/1996 | Balogh |
| 5,495,604 A | 2/1996 | Harding et al. |
| 5,502,790 A | 3/1996 | Yi |
| 5,502,791 A | 3/1996 | Nishimura et al. |
| 5,515,475 A | 5/1996 | Gupta et al. |
| 5,536,902 A | 7/1996 | Serra et al. |
| 5,537,618 A | 7/1996 | Boulton et al. |
| 5,574,823 A | 11/1996 | Hassanein et al. |
| 5,577,241 A | 11/1996 | Spencer |
| 5,578,808 A | 11/1996 | Taylor |
| 5,579,436 A | 11/1996 | Chou et al. |
| 5,581,655 A | 12/1996 | Cohen et al. |
| 5,584,024 A | 12/1996 | Shwartz |
| 5,596,676 A | 1/1997 | Swaminathan et al. |
| 5,596,994 A | 1/1997 | Bro |
| 5,608,624 A | 3/1997 | Luciw |
| 5,613,036 A | 3/1997 | Strong |
| 5,617,507 A | 4/1997 | Lee et al. |
| 5,619,694 A | 4/1997 | Shimazu |
| 5,621,859 A | 4/1997 | Schwartz et al. |
| 5,621,903 A | 4/1997 | Luciw et al. |
| 5,642,464 A | 6/1997 | Yue et al. |
| 5,642,519 A | 6/1997 | Martin |
| 5,644,727 A | 7/1997 | Atkins |
| 5,664,055 A | 9/1997 | Kroon |
| 5,675,819 A | 10/1997 | Schuetze |
| 5,682,539 A | 10/1997 | Conrad et al. |
| 5,687,077 A | 11/1997 | Gough, Jr. |
| 5,696,962 A | 12/1997 | Kupiec |
| 5,701,400 A | 12/1997 | Amado |
| 5,706,442 A | 1/1998 | Anderson et al. |
| 5,710,886 A | 1/1998 | Christensen et al. |
| 5,712,957 A | 1/1998 | Waibel et al. |
| 5,715,468 A | 2/1998 | Budzinski |
| 5,721,827 A | 2/1998 | Logan et al. |
| 5,727,950 A | 3/1998 | Cook et al. |
| 5,729,694 A | 3/1998 | Holzrichter et al. |
| 5,732,390 A | 3/1998 | Katayanagi et al. |
| 5,734,791 A | 3/1998 | Acero et al. |
| 5,737,734 A | 4/1998 | Schultz |
| 5,748,974 A | 5/1998 | Johnson |
| 5,749,081 A | 5/1998 | Whiteis |
| 5,759,101 A | 6/1998 | Von Kohorn |
| 5,790,978 A | 8/1998 | Olive et al. |
| 5,794,050 A | 8/1998 | Dahlgren et al. |
| 5,794,182 A | 8/1998 | Manduchi et al. |
| 5,794,207 A | 8/1998 | Walker et al. |
| 5,794,237 A | 8/1998 | Gore, Jr. |
| 5,799,276 A | 8/1998 | Komissarchik et al. |
| 5,822,743 A | 10/1998 | Gupta et al. |
| 5,825,881 A | 10/1998 | Colvin, Sr. |
| 5,826,261 A | 10/1998 | Spencer |
| 5,828,999 A | 10/1998 | Bellegarda et al. |
| 5,835,893 A | 11/1998 | Ushioda |
| 5,839,106 A | 11/1998 | Bellegarda |
| 5,845,255 A | 12/1998 | Mayaud |
| 5,857,184 A | 1/1999 | Lynch |
| 5,860,063 A | 1/1999 | Gorin et al. |
| 5,862,223 A | 1/1999 | Walker et al. |

(56) References Cited

U.S. PATENT DOCUMENTS

| | | |
|---|---|---|
| 5,864,806 A | 1/1999 | Mokbel et al. |
| 5,864,844 A | 1/1999 | James et al. |
| 5,867,799 A | 2/1999 | Lang et al. |
| 5,873,056 A | 2/1999 | Liddy et al. |
| 5,875,437 A | 2/1999 | Atkins |
| 5,884,323 A | 3/1999 | Hawkins et al. |
| 5,895,464 A | 4/1999 | Bhandari et al. |
| 5,895,466 A | 4/1999 | Goldberg et al. |
| 5,899,972 A | 5/1999 | Miyazawa et al. |
| 5,913,193 A | 6/1999 | Huang et al. |
| 5,915,249 A | 6/1999 | Spencer |
| 5,930,769 A | 7/1999 | Rose |
| 5,933,822 A | 8/1999 | Braden-Harder et al. |
| 5,936,926 A | 8/1999 | Yokouchi et al. |
| 5,940,811 A | 8/1999 | Norris |
| 5,941,944 A | 8/1999 | Messerly |
| 5,943,670 A | 8/1999 | Prager |
| 5,948,040 A | 9/1999 | DeLorme et al. |
| 5,956,699 A | 9/1999 | Wong et al. |
| 5,960,422 A | 9/1999 | Prasad |
| 5,963,924 A | 10/1999 | Williams et al. |
| 5,966,126 A | 10/1999 | Szabo |
| 5,970,474 A | 10/1999 | LeRoy et al. |
| 5,974,146 A | 10/1999 | Randle et al. |
| 5,982,891 A | 11/1999 | Ginter et al. |
| 5,987,132 A | 11/1999 | Rowney |
| 5,987,140 A | 11/1999 | Rowney et al. |
| 5,987,404 A | 11/1999 | Della Pietra et al. |
| 5,987,440 A | 11/1999 | O'Neil et al. |
| 5,999,908 A | 12/1999 | Abelow |
| 6,016,471 A | 1/2000 | Kuhn et al. |
| 6,023,684 A | 2/2000 | Pearson |
| 6,024,288 A | 2/2000 | Gottlich et al. |
| 6,026,345 A | 2/2000 | Shah et al. |
| 6,026,375 A | 2/2000 | Hall et al. |
| 6,026,388 A | 2/2000 | Liddy et al. |
| 6,026,393 A | 2/2000 | Gupta et al. |
| 6,029,132 A | 2/2000 | Kuhn et al. |
| 6,038,533 A | 3/2000 | Buchsbaum et al. |
| 6,052,656 A | 4/2000 | Suda et al. |
| 6,055,514 A | 4/2000 | Wren |
| 6,055,531 A | 4/2000 | Bennett et al. |
| 6,064,960 A | 5/2000 | Bellegarda et al. |
| 6,070,139 A | 5/2000 | Miyazawa et al. |
| 6,070,147 A | 5/2000 | Harms et al. |
| 6,076,051 A | 6/2000 | Messerly et al. |
| 6,076,088 A | 6/2000 | Paik et al. |
| 6,078,914 A | 6/2000 | Redfern |
| 6,081,750 A | 6/2000 | Hoffberg et al. |
| 6,081,774 A | 6/2000 | de Hita et al. |
| 6,088,731 A | 7/2000 | Kiraly et al. |
| 6,094,649 A | 7/2000 | Bowen et al. |
| 6,105,865 A | 8/2000 | Hardesty |
| 6,108,627 A | 8/2000 | Sabourin |
| 6,119,101 A | 9/2000 | Peckover |
| 6,122,616 A | 9/2000 | Henton |
| 6,125,356 A | 9/2000 | Brockman et al. |
| 6,144,938 A | 11/2000 | Surace et al. |
| 6,173,261 B1 | 1/2001 | Arai et al. |
| 6,173,279 B1 | 1/2001 | Levin et al. |
| 6,188,999 B1 | 2/2001 | Moody |
| 6,195,641 B1 | 2/2001 | Loring et al. |
| 6,205,456 B1 | 3/2001 | Nakao |
| 6,208,971 B1 | 3/2001 | Bellegarda et al. |
| 6,233,559 B1 | 5/2001 | Balakrishnan |
| 6,233,578 B1 | 5/2001 | Machihara et al. |
| 6,246,981 B1 | 6/2001 | Papineni et al. |
| 6,260,024 B1 | 7/2001 | Shkedy |
| 6,266,637 B1 | 7/2001 | Donovan et al. |
| 6,275,824 B1 | 8/2001 | O'Flaherty et al. |
| 6,285,786 B1 | 9/2001 | Seni et al. |
| 6,308,149 B1 | 10/2001 | Gaussier et al. |
| 6,311,189 B1 | 10/2001 | deVries et al. |
| 6,317,594 B1 | 11/2001 | Gossman et al. |
| 6,317,707 B1 | 11/2001 | Bangalore et al. |
| 6,317,831 B1 | 11/2001 | King |
| 6,321,092 B1 | 11/2001 | Fitch et al. |
| 6,334,103 B1 | 12/2001 | Surace et al. |
| 6,356,854 B1 | 3/2002 | Schubert et al. |
| 6,356,905 B1 | 3/2002 | Gershman et al. |
| 6,366,883 B1 | 4/2002 | Campbell et al. |
| 6,366,884 B1 | 4/2002 | Bellegarda et al. |
| 6,421,672 B1 | 7/2002 | McAllister et al. |
| 6,434,524 B1 | 8/2002 | Weber |
| 6,446,076 B1 | 9/2002 | Burkey et al. |
| 6,449,620 B1 | 9/2002 | Draper et al. |
| 6,453,292 B2 | 9/2002 | Ramaswamy et al. |
| 6,460,029 B1 | 10/2002 | Fries et al. |
| 6,466,654 B1 | 10/2002 | Cooper et al. |
| 6,477,488 B1 | 11/2002 | Bellegarda |
| 6,487,534 B1 | 11/2002 | Thelen et al. |
| 6,499,013 B1 | 12/2002 | Weber |
| 6,501,937 B1 | 12/2002 | Ho et al. |
| 6,505,158 B1 | 1/2003 | Conkie |
| 6,505,175 B1 | 1/2003 | Silverman et al. |
| 6,505,183 B1 | 1/2003 | Loofbourrow et al. |
| 6,510,417 B1 | 1/2003 | Woods et al. |
| 6,513,063 B1 | 1/2003 | Julia et al. |
| 6,523,061 B1 | 2/2003 | Halverson et al. |
| 6,523,172 B1 | 2/2003 | Martinez-Guerra et al. |
| 6,526,382 B1 | 2/2003 | Yuschik |
| 6,526,395 B1 | 2/2003 | Morris |
| 6,532,444 B1 | 3/2003 | Weber |
| 6,532,446 B1 | 3/2003 | King |
| 6,546,388 B1 | 4/2003 | Edlund et al. |
| 6,553,344 B2 | 4/2003 | Bellegarda et al. |
| 6,556,983 B1 | 4/2003 | Altschuler et al. |
| 6,584,464 B1 | 6/2003 | Warthen |
| 6,598,039 B1 | 7/2003 | Livowsky |
| 6,601,026 B2 | 7/2003 | Appelt et al. |
| 6,601,234 B1 | 7/2003 | Bowman-Amuah |
| 6,604,059 B2 | 8/2003 | Strubbe et al. |
| 6,615,172 B1 | 9/2003 | Bennett et al. |
| 6,615,175 B1 | 9/2003 | Gazdzinski |
| 6,615,220 B1 | 9/2003 | Austin et al. |
| 6,625,583 B1 | 9/2003 | Silverman et al. |
| 6,631,346 B1 | 10/2003 | Karaorman et al. |
| 6,633,846 B1 | 10/2003 | Bennett et al. |
| 6,647,260 B2 | 11/2003 | Dusse et al. |
| 6,650,735 B2 | 11/2003 | Burton et al. |
| 6,654,740 B2 | 11/2003 | Tokuda et al. |
| 6,665,639 B2 | 12/2003 | Mozer et al. |
| 6,665,640 B1 | 12/2003 | Bennett et al. |
| 6,665,641 B1 | 12/2003 | Coorman et al. |
| 6,684,187 B1 | 1/2004 | Conkie |
| 6,691,064 B2 | 2/2004 | Vroman |
| 6,691,111 B2 | 2/2004 | Lazaridis et al. |
| 6,691,151 B1 * | 2/2004 | Cheyer et al. ................. 709/202 |
| 6,697,780 B1 | 2/2004 | Beutnagel et al. |
| 6,697,824 B1 | 2/2004 | Bowman-Amuah |
| 6,701,294 B1 | 3/2004 | Ball et al. |
| 6,711,585 B1 | 3/2004 | Copperman et al. |
| 6,718,324 B2 | 4/2004 | Edlund et al. |
| 6,721,728 B2 | 4/2004 | McGreevy |
| 6,735,632 B1 | 5/2004 | Kiraly et al. |
| 6,742,021 B1 | 5/2004 | Halverson et al. |
| 6,757,362 B1 | 6/2004 | Cooper et al. |
| 6,757,718 B1 | 6/2004 | Halverson et al. |
| 6,766,320 B1 | 7/2004 | Want et al. |
| 6,778,951 B1 | 8/2004 | Contractor |
| 6,778,952 B2 | 8/2004 | Bellegarda |
| 6,778,962 B1 | 8/2004 | Kasai et al. |
| 6,778,970 B2 | 8/2004 | Au |
| 6,792,082 B1 | 9/2004 | Levine |
| 6,807,574 B1 | 10/2004 | Partovi et al. |
| 6,810,379 B1 | 10/2004 | Vermeulen et al. |
| 6,813,491 B1 | 11/2004 | McKinney |
| 6,829,603 B1 | 12/2004 | Chai et al. |
| 6,832,194 B1 | 12/2004 | Mozer et al. |
| 6,842,767 B1 | 1/2005 | Partovi et al. |
| 6,847,966 B1 | 1/2005 | Sommer et al. |
| 6,847,979 B2 | 1/2005 | Allemang et al. |
| 6,851,115 B1 | 2/2005 | Cheyer et al. |
| 6,859,931 B1 | 2/2005 | Cheyer et al. |

(56) References Cited

U.S. PATENT DOCUMENTS

| | | | |
|---|---|---|---|
| 6,895,380 B2 | 5/2005 | Sepe, Jr. | |
| 6,895,558 B1 | 5/2005 | Loveland | |
| 6,901,399 B1 | 5/2005 | Corston et al. | |
| 6,912,499 B1 | 6/2005 | Sabourin et al. | |
| 6,915,294 B1 * | 7/2005 | Singh et al. ........................ 1/1 | |
| 6,924,828 B1 | 8/2005 | Hirsch | |
| 6,928,614 B1 | 8/2005 | Everhart | |
| 6,931,384 B1 | 8/2005 | Horvitz et al. | |
| 6,937,975 B1 | 8/2005 | Elworthy | |
| 6,937,986 B2 | 8/2005 | Denenberg et al. | |
| 6,964,023 B2 | 11/2005 | Maes et al. | |
| 6,980,949 B2 | 12/2005 | Ford | |
| 6,980,955 B2 | 12/2005 | Okutani et al. | |
| 6,985,865 B1 | 1/2006 | Packingham et al. | |
| 6,988,071 B1 | 1/2006 | Gazdzinski | |
| 6,996,531 B2 | 2/2006 | Korall et al. | |
| 6,999,927 B2 | 2/2006 | Mozer et al. | |
| 7,020,685 B1 | 3/2006 | Chen et al. | |
| 7,027,974 B1 | 4/2006 | Busch et al. | |
| 7,036,128 B1 | 4/2006 | Julia et al. | |
| 7,050,977 B1 | 5/2006 | Bennett | |
| 7,058,569 B2 | 6/2006 | Coorman et al. | |
| 7,062,428 B2 | 6/2006 | Hogenhout et al. | |
| 7,069,560 B1 | 6/2006 | Cheyer et al. | |
| 7,092,887 B2 | 8/2006 | Mozer et al. | |
| 7,092,928 B1 | 8/2006 | Elad et al. | |
| 7,093,693 B1 | 8/2006 | Gazdzinski | |
| 7,127,046 B1 | 10/2006 | Smith et al. | |
| 7,127,403 B1 | 10/2006 | Saylor et al. | |
| 7,136,710 B1 | 11/2006 | Hoffberg et al. | |
| 7,137,126 B1 | 11/2006 | Coffman et al. | |
| 7,139,714 B2 | 11/2006 | Bennett et al. | |
| 7,139,722 B2 | 11/2006 | Perrella et al. | |
| 7,152,070 B1 | 12/2006 | Musick et al. | |
| 7,177,798 B2 | 2/2007 | Hsu et al. | |
| 7,197,460 B1 | 3/2007 | Gupta et al. | |
| 7,200,559 B2 | 4/2007 | Wang | |
| 7,203,646 B2 | 4/2007 | Bennett | |
| 7,216,073 B2 | 5/2007 | Lavi et al. | |
| 7,216,080 B2 | 5/2007 | Tsiao et al. | |
| 7,225,125 B2 | 5/2007 | Bennett et al. | |
| 7,233,790 B2 | 6/2007 | Kjellberg et al. | |
| 7,233,904 B2 | 6/2007 | Luisi | |
| 7,266,496 B2 | 9/2007 | Wang et al. | |
| 7,277,854 B2 | 10/2007 | Bennett et al. | |
| 7,290,039 B1 | 10/2007 | Lisitsa et al. | |
| 7,299,033 B2 | 11/2007 | Kjellberg et al. | |
| 7,310,600 B1 | 12/2007 | Garner et al. | |
| 7,324,947 B2 | 1/2008 | Jordan et al. | |
| 7,349,953 B2 | 3/2008 | Lisitsa et al. | |
| 7,376,556 B2 | 5/2008 | Bennett | |
| 7,376,645 B2 | 5/2008 | Bernard | |
| 7,379,874 B2 | 5/2008 | Schmid et al. | |
| 7,386,449 B2 | 6/2008 | Sun et al. | |
| 7,389,224 B1 | 6/2008 | Elworthy | |
| 7,392,185 B2 | 6/2008 | Bennett | |
| 7,398,209 B2 | 7/2008 | Kennewick et al. | |
| 7,403,938 B2 | 7/2008 | Harrison et al. | |
| 7,409,337 B1 | 8/2008 | Potter et al. | |
| 7,415,100 B2 | 8/2008 | Cooper et al. | |
| 7,415,469 B2 * | 8/2008 | Singh et al. ........................ 1/1 | |
| 7,418,392 B1 | 8/2008 | Mozer et al. | |
| 7,426,467 B2 | 9/2008 | Nashida et al. | |
| 7,427,024 B1 | 9/2008 | Gazdzinski et al. | |
| 7,447,635 B1 | 11/2008 | Konopka et al. | |
| 7,454,351 B2 | 11/2008 | Jeschke et al. | |
| 7,467,087 B1 | 12/2008 | Gillick et al. | |
| 7,475,010 B2 | 1/2009 | Chao | |
| 7,483,894 B2 | 1/2009 | Cao | |
| 7,487,089 B2 | 2/2009 | Mozer | |
| 7,496,498 B2 | 2/2009 | Chu et al. | |
| 7,496,512 B2 | 2/2009 | Zhao et al. | |
| 7,502,738 B2 | 3/2009 | Kennewick et al. | |
| 7,508,373 B2 | 3/2009 | Lin et al. | |
| 7,522,927 B2 | 4/2009 | Fitch et al. | |
| 7,523,108 B2 | 4/2009 | Cao | |
| 7,526,466 B2 | 4/2009 | Au | |
| 7,529,671 B2 | 5/2009 | Rockenbeck et al. | |
| 7,529,676 B2 | 5/2009 | Koyama | |
| 7,539,656 B2 | 5/2009 | Fratkina et al. | |
| 7,542,971 B2 * | 6/2009 | Thione et al. ........................ 1/1 | |
| 7,546,382 B2 | 6/2009 | Healey et al. | |
| 7,548,895 B2 | 6/2009 | Pulsipher | |
| 7,552,055 B2 | 6/2009 | Lecoeuche | |
| 7,555,431 B2 | 6/2009 | Bennett | |
| 7,558,730 B2 | 7/2009 | Davis et al. | |
| 7,571,106 B2 | 8/2009 | Cao et al. | |
| 7,599,918 B2 | 10/2009 | Shen et al. | |
| 7,620,549 B2 | 11/2009 | Di Cristo et al. | |
| 7,624,007 B2 | 11/2009 | Bennett | |
| 7,634,409 B2 | 12/2009 | Kennewick et al. | |
| 7,636,657 B2 | 12/2009 | Ju et al. | |
| 7,640,160 B2 | 12/2009 | Di Cristo et al. | |
| 7,647,225 B2 | 1/2010 | Bennett et al. | |
| 7,657,424 B2 | 2/2010 | Bennett | |
| 7,672,841 B2 | 3/2010 | Bennett | |
| 7,676,026 B1 | 3/2010 | Baxter, Jr. | |
| 7,684,985 B2 | 3/2010 | Dominach et al. | |
| 7,693,715 B2 | 4/2010 | Hwang et al. | |
| 7,693,720 B2 | 4/2010 | Kennewick et al. | |
| 7,698,131 B2 | 4/2010 | Bennett | |
| 7,702,500 B2 | 4/2010 | Blaedow | |
| 7,702,508 B2 | 4/2010 | Bennett | |
| 7,707,027 B2 | 4/2010 | Balchandran et al. | |
| 7,707,032 B2 | 4/2010 | Wang et al. | |
| 7,707,267 B2 | 4/2010 | Lisitsa et al. | |
| 7,711,565 B1 | 5/2010 | Gazdzinski | |
| 7,711,672 B2 | 5/2010 | Au | |
| 7,716,056 B2 | 5/2010 | Weng et al. | |
| 7,716,216 B1 * | 5/2010 | Harik et al. ................... 707/724 | |
| 7,720,674 B2 | 5/2010 | Kaiser et al. | |
| 7,720,683 B1 | 5/2010 | Vermeulen et al. | |
| 7,725,307 B2 | 5/2010 | Bennett | |
| 7,725,318 B2 | 5/2010 | Gavalda et al. | |
| 7,725,320 B2 | 5/2010 | Bennett | |
| 7,725,321 B2 | 5/2010 | Bennett | |
| 7,729,904 B2 | 6/2010 | Bennett | |
| 7,729,916 B2 | 6/2010 | Coffman et al. | |
| 7,734,461 B2 | 6/2010 | Kwak et al. | |
| 7,747,616 B2 | 6/2010 | Yamada et al. | |
| 7,752,152 B2 | 7/2010 | Paek et al. | |
| 7,756,868 B2 | 7/2010 | Lee | |
| 7,756,871 B2 * | 7/2010 | Yacoub et al. ................. 707/736 | |
| 7,774,204 B2 | 8/2010 | Mozer et al. | |
| 7,783,486 B2 | 8/2010 | Rosser et al. | |
| 7,801,729 B2 | 9/2010 | Mozer | |
| 7,809,570 B2 | 10/2010 | Kennewick et al. | |
| 7,809,610 B2 | 10/2010 | Cao | |
| 7,818,176 B2 | 10/2010 | Freeman et al. | |
| 7,822,608 B2 | 10/2010 | Cross, Jr. et al. | |
| 7,826,945 B2 | 11/2010 | Zhang et al. | |
| 7,831,426 B2 | 11/2010 | Bennett | |
| 7,840,400 B2 | 11/2010 | Lavi et al. | |
| 7,840,447 B2 | 11/2010 | Kleinrock et al. | |
| 7,853,574 B2 | 12/2010 | Kraenzel et al. | |
| 7,870,133 B2 * | 1/2011 | Krishnamoorthy et al. .. 707/736 | |
| 7,873,519 B2 | 1/2011 | Bennett | |
| 7,873,654 B2 | 1/2011 | Bernard | |
| 7,881,936 B2 | 2/2011 | Longé et al. | |
| 7,890,652 B2 | 2/2011 | Bull et al. | |
| 7,912,702 B2 | 3/2011 | Bennett | |
| 7,917,367 B2 | 3/2011 | Di Cristo et al. | |
| 7,917,497 B2 | 3/2011 | Harrison et al. | |
| 7,920,678 B2 | 4/2011 | Cooper et al. | |
| 7,925,525 B2 | 4/2011 | Chin | |
| 7,930,168 B2 | 4/2011 | Weng et al. | |
| 7,949,529 B2 | 5/2011 | Weider et al. | |
| 7,949,534 B2 | 5/2011 | Davis et al. | |
| 7,974,844 B2 | 7/2011 | Sumita | |
| 7,974,972 B2 | 7/2011 | Cao | |
| 7,983,915 B2 | 7/2011 | Knight et al. | |
| 7,983,917 B2 | 7/2011 | Kennewick et al. | |
| 7,983,997 B2 | 7/2011 | Allen et al. | |
| 7,986,431 B2 | 7/2011 | Emori et al. | |

(56) References Cited

U.S. PATENT DOCUMENTS

| | | |
|---|---|---|
| 7,987,151 B2 | 7/2011 | Schott et al. |
| 7,996,228 B2 | 8/2011 | Miller et al. |
| 8,000,453 B2 | 8/2011 | Cooper et al. |
| 8,005,679 B2 | 8/2011 | Jordan et al. |
| 8,015,006 B2 | 9/2011 | Kennewick et al. |
| 8,024,195 B2 | 9/2011 | Mozer et al. |
| 8,036,901 B2 | 10/2011 | Mozer |
| 8,041,570 B2 | 10/2011 | Mirkovic et al. |
| 8,041,611 B2 | 10/2011 | Kleinrock et al. |
| 8,055,708 B2 | 11/2011 | Chitsaz et al. |
| 8,065,155 B1 | 11/2011 | Gazdzinski |
| 8,065,156 B2 | 11/2011 | Gazdzinski |
| 8,069,046 B2 | 11/2011 | Kennewick et al. |
| 8,073,681 B2 | 12/2011 | Baldwin et al. |
| 8,078,473 B1 | 12/2011 | Gazdzinski |
| 8,082,153 B2 | 12/2011 | Coffman et al. |
| 8,095,364 B2 | 1/2012 | Longé et al. |
| 8,099,289 B2 | 1/2012 | Mozer et al. |
| 8,107,401 B2 | 1/2012 | John et al. |
| 8,112,275 B2 | 2/2012 | Kennewick et al. |
| 8,112,280 B2 | 2/2012 | Lu |
| 8,117,037 B2 | 2/2012 | Gazdzinski |
| 8,131,557 B2 | 3/2012 | Davis et al. |
| 8,140,335 B2 | 3/2012 | Kennewick et al. |
| 8,165,886 B1 | 4/2012 | Gagnon et al. |
| 8,166,019 B1 | 4/2012 | Lee et al. |
| 8,166,032 B2* | 4/2012 | Sommer et al. .............. 707/736 |
| 8,190,359 B2 | 5/2012 | Bourne |
| 8,195,467 B2 | 6/2012 | Mozer et al. |
| 8,204,238 B2 | 6/2012 | Mozer |
| 8,205,788 B1 | 6/2012 | Gazdzinski et al. |
| 8,219,407 B1 | 7/2012 | Roy et al. |
| 8,285,551 B2 | 10/2012 | Gazdzinski |
| 8,285,553 B2 | 10/2012 | Gazdzinski |
| 8,290,778 B2 | 10/2012 | Gazdzinski |
| 8,290,781 B2 | 10/2012 | Gazdzinski |
| 8,296,146 B2 | 10/2012 | Gazdzinski |
| 8,296,153 B2 | 10/2012 | Gazdzinski |
| 8,301,456 B2 | 10/2012 | Gazdzinski |
| 8,311,834 B1 | 11/2012 | Gazdzinski |
| 8,312,017 B2* | 11/2012 | Martin et al. .............. 707/736 |
| 8,370,158 B2 | 2/2013 | Gazdzinski |
| 8,371,503 B2 | 2/2013 | Gazdzinski |
| 8,374,871 B2 | 2/2013 | Ehsani et al. |
| 8,386,485 B2* | 2/2013 | Kerschberg et al. .......... 707/736 |
| 8,447,612 B2 | 5/2013 | Gazdzinski |
| 8,458,115 B2* | 6/2013 | Cai et al. .................. 706/52 |
| 2001/0047264 A1 | 11/2001 | Roundtree |
| 2002/0032564 A1 | 3/2002 | Ehsani et al. |
| 2002/0046025 A1 | 4/2002 | Hain |
| 2002/0069063 A1 | 6/2002 | Buchner et al. |
| 2002/0077817 A1 | 6/2002 | Atal |
| 2002/0103641 A1 | 8/2002 | Kuo et al. |
| 2002/0164000 A1 | 11/2002 | Cohen et al. |
| 2002/0198714 A1 | 12/2002 | Zhou |
| 2004/0093328 A1* | 5/2004 | Damle .................. 707/3 |
| 2004/0098250 A1* | 5/2004 | Kimchi et al. .............. 704/9 |
| 2004/0135701 A1 | 7/2004 | Yasuda et al. |
| 2004/0236778 A1 | 11/2004 | Junqua et al. |
| 2005/0055403 A1 | 3/2005 | Brittan |
| 2005/0071332 A1 | 3/2005 | Ortega et al. |
| 2005/0080625 A1 | 4/2005 | Bennett et al. |
| 2005/0091118 A1 | 4/2005 | Fano |
| 2005/0102614 A1 | 5/2005 | Brockett et al. |
| 2005/0108001 A1 | 5/2005 | Aarskog |
| 2005/0114124 A1 | 5/2005 | Liu et al. |
| 2005/0119897 A1 | 6/2005 | Bennett et al. |
| 2005/0143972 A1 | 6/2005 | Gopalakrishnan et al. |
| 2005/0165607 A1 | 7/2005 | Di Fabbrizio et al. |
| 2005/0182629 A1 | 8/2005 | Coorman et al. |
| 2005/0182765 A1* | 8/2005 | Liddy .................. 707/5 |
| 2005/0196733 A1 | 9/2005 | Budra et al. |
| 2005/0288936 A1 | 12/2005 | Busayapongchai et al. |
| 2006/0018492 A1 | 1/2006 | Chiu et al. |
| 2006/0106592 A1 | 5/2006 | Brockett et al. |
| 2006/0106594 A1 | 5/2006 | Brockett et al. |
| 2006/0106595 A1 | 5/2006 | Brockett et al. |
| 2006/0117002 A1 | 6/2006 | Swen |
| 2006/0122834 A1 | 6/2006 | Bennett |
| 2006/0143007 A1 | 6/2006 | Koh et al. |
| 2007/0055529 A1 | 3/2007 | Kanevsky et al. |
| 2007/0058832 A1 | 3/2007 | Hug et al. |
| 2007/0073745 A1* | 3/2007 | Scott et al. .................. 707/100 |
| 2007/0088556 A1 | 4/2007 | Andrew |
| 2007/0100790 A1* | 5/2007 | Cheyer et al. .................. 707/1 |
| 2007/0106674 A1 | 5/2007 | Agrawal et al. |
| 2007/0118377 A1 | 5/2007 | Badino et al. |
| 2007/0135949 A1 | 6/2007 | Snover et al. |
| 2007/0174188 A1 | 7/2007 | Fish |
| 2007/0185917 A1 | 8/2007 | Prahlad et al. |
| 2007/0282595 A1 | 12/2007 | Tunning et al. |
| 2008/0015864 A1 | 1/2008 | Ross et al. |
| 2008/0021708 A1 | 1/2008 | Bennett et al. |
| 2008/0034032 A1 | 2/2008 | Healey et al. |
| 2008/0052063 A1 | 2/2008 | Bennett et al. |
| 2008/0120112 A1 | 5/2008 | Jordan et al. |
| 2008/0129520 A1 | 6/2008 | Lee |
| 2008/0140657 A1 | 6/2008 | Azvine et al. |
| 2008/0221903 A1 | 9/2008 | Kanevsky et al. |
| 2008/0228496 A1 | 9/2008 | Yu et al. |
| 2008/0247519 A1 | 10/2008 | Abella et al. |
| 2008/0249770 A1 | 10/2008 | Kim et al. |
| 2008/0300878 A1 | 12/2008 | Bennett |
| 2008/0319763 A1 | 12/2008 | Di Fabbrizio et al. |
| 2009/0006100 A1 | 1/2009 | Badger et al. |
| 2009/0006343 A1 | 1/2009 | Platt et al. |
| 2009/0030800 A1 | 1/2009 | Grois |
| 2009/0055179 A1 | 2/2009 | Cho et al. |
| 2009/0058823 A1 | 3/2009 | Kocienda |
| 2009/0076796 A1 | 3/2009 | Daraselia |
| 2009/0077165 A1 | 3/2009 | Rhodes et al. |
| 2009/0100049 A1 | 4/2009 | Cao |
| 2009/0112677 A1 | 4/2009 | Rhett |
| 2009/0150156 A1 | 6/2009 | Kennewick et al. |
| 2009/0157401 A1 | 6/2009 | Bennett |
| 2009/0164441 A1 | 6/2009 | Cheyer |
| 2009/0171664 A1 | 7/2009 | Kennewick et al. |
| 2009/0204620 A1* | 8/2009 | Thione et al. .................. 707/10 |
| 2009/0287583 A1 | 11/2009 | Holmes |
| 2009/0290718 A1 | 11/2009 | Kahn et al. |
| 2009/0299745 A1 | 12/2009 | Kennewick et al. |
| 2009/0299849 A1 | 12/2009 | Cao et al. |
| 2009/0307162 A1 | 12/2009 | Bui et al. |
| 2010/0005081 A1 | 1/2010 | Bennett |
| 2010/0023320 A1 | 1/2010 | Di Cristo et al. |
| 2010/0036660 A1 | 2/2010 | Bennett |
| 2010/0042400 A1 | 2/2010 | Block et al. |
| 2010/0088020 A1 | 4/2010 | Sano et al. |
| 2010/0131498 A1* | 5/2010 | Linthicum et al. ............ 707/722 |
| 2010/0138215 A1 | 6/2010 | Williams |
| 2010/0145700 A1 | 6/2010 | Kennewick et al. |
| 2010/0204986 A1 | 8/2010 | Kennewick et al. |
| 2010/0217604 A1 | 8/2010 | Baldwin et al. |
| 2010/0228540 A1 | 9/2010 | Bennett |
| 2010/0235341 A1 | 9/2010 | Bennett |
| 2010/0257160 A1 | 10/2010 | Cao |
| 2010/0262599 A1 | 10/2010 | Nitz |
| 2010/0277579 A1 | 11/2010 | Cho et al. |
| 2010/0280983 A1 | 11/2010 | Cho et al. |
| 2010/0286985 A1 | 11/2010 | Kennewick et al. |
| 2010/0299142 A1 | 11/2010 | Freeman et al. |
| 2010/0312547 A1 | 12/2010 | Van Os et al. |
| 2010/0318576 A1 | 12/2010 | Kim |
| 2010/0332235 A1 | 12/2010 | David |
| 2010/0332348 A1 | 12/2010 | Cao |
| 2011/0047072 A1 | 2/2011 | Ciurea |
| 2011/0060807 A1 | 3/2011 | Martin et al. |
| 2011/0082688 A1 | 4/2011 | Kim et al. |
| 2011/0112827 A1 | 5/2011 | Kennewick et al. |
| 2011/0112921 A1 | 5/2011 | Kennewick et al. |
| 2011/0119049 A1 | 5/2011 | Ylonen |
| 2011/0125540 A1 | 5/2011 | Jang et al. |
| 2011/0130958 A1 | 6/2011 | Stahl et al. |
| 2011/0131036 A1 | 6/2011 | Di Cristo et al. |

(56) References Cited

U.S. PATENT DOCUMENTS

| | | | |
|---|---|---|---|
| 2011/0131045 A1 | 6/2011 | Cristo et al. | |
| 2011/0143811 A1 | 6/2011 | Rodriguez | |
| 2011/0144999 A1 | 6/2011 | Jang et al. | |
| 2011/0161076 A1 | 6/2011 | Davis et al. | |
| 2011/0161309 A1 | 6/2011 | Lung et al. | |
| 2011/0175810 A1 | 7/2011 | Markovic et al. | |
| 2011/0184730 A1 | 7/2011 | Lebeau et al. | |
| 2011/0202526 A1* | 8/2011 | Lee et al. | 707/726 |
| 2011/0218855 A1 | 9/2011 | Cao et al. | |
| 2011/0231182 A1 | 9/2011 | Weider et al. | |
| 2011/0231188 A1 | 9/2011 | Kennewick et al. | |
| 2011/0258188 A1* | 10/2011 | AbdAlmageed et al. | 707/736 |
| 2011/0264643 A1 | 10/2011 | Cao | |
| 2011/0279368 A1 | 11/2011 | Klein et al. | |
| 2011/0282888 A1* | 11/2011 | Koperski et al. | 707/752 |
| 2011/0302162 A1* | 12/2011 | Xiao et al. | 707/724 |
| 2011/0306426 A1 | 12/2011 | Novak et al. | |
| 2011/0314032 A1* | 12/2011 | Bennett et al. | 707/749 |
| 2012/0002820 A1 | 1/2012 | Leichter | |
| 2012/0016678 A1 | 1/2012 | Gruber et al. | |
| 2012/0020490 A1 | 1/2012 | Leichter | |
| 2012/0022787 A1 | 1/2012 | Lebeau et al. | |
| 2012/0022857 A1 | 1/2012 | Baldwin et al. | |
| 2012/0022860 A1 | 1/2012 | Lloyd et al. | |
| 2012/0022868 A1 | 1/2012 | LeBeau et al. | |
| 2012/0022869 A1 | 1/2012 | Lloyd et al. | |
| 2012/0022870 A1 | 1/2012 | Kristjansson et al. | |
| 2012/0022874 A1 | 1/2012 | Lloyd et al. | |
| 2012/0022876 A1 | 1/2012 | LeBeau et al. | |
| 2012/0023088 A1 | 1/2012 | Cheng et al. | |
| 2012/0034904 A1 | 2/2012 | LeBeau et al. | |
| 2012/0035908 A1 | 2/2012 | LeBeau et al. | |
| 2012/0035924 A1 | 2/2012 | Jitkoff et al. | |
| 2012/0035931 A1 | 2/2012 | LeBeau et al. | |
| 2012/0035932 A1 | 2/2012 | Jitkoff et al. | |
| 2012/0042343 A1 | 2/2012 | Laligand et al. | |
| 2012/0137367 A1 | 5/2012 | Dupont et al. | |
| 2012/0173464 A1 | 7/2012 | Tur et al. | |
| 2012/0209853 A1* | 8/2012 | Desai et al. | 707/741 |
| 2012/0265528 A1 | 10/2012 | Gruber et al. | |
| 2012/0271676 A1 | 10/2012 | Aravamudan et al. | |
| 2012/0296891 A1* | 11/2012 | Rangan | 707/722 |
| 2012/0311583 A1 | 12/2012 | Gruber et al. | |
| 2013/0091090 A1* | 4/2013 | Spivack et al. | 707/608 |
| 2013/0110518 A1 | 5/2013 | Gruber et al. | |
| 2013/0110520 A1 | 5/2013 | Cheyer et al. | |

FOREIGN PATENT DOCUMENTS

| | | |
|---|---|---|
| DE | 198 41 541 B4 | 12/2007 |
| EP | 0138061 B1 | 9/1984 |
| EP | 0138061 A1 | 4/1985 |
| EP | 0218859 A2 | 4/1987 |
| EP | 0262938 A1 | 4/1988 |
| EP | 0293259 A2 | 11/1988 |
| EP | 0299572 A2 | 1/1989 |
| EP | 0313975 A2 | 5/1989 |
| EP | 0314908 A2 | 5/1989 |
| EP | 0327408 A2 | 8/1989 |
| EP | 0389271 A2 | 9/1990 |
| EP | 0411675 A2 | 2/1991 |
| EP | 0559349 A1 | 9/1993 |
| EP | 0559349 B1 | 9/1993 |
| EP | 0570660 A1 | 11/1993 |
| EP | 0863453 A1 | 9/1998 |
| EP | 1245023 A1 | 10/2002 |
| EP | 2 109 295 A1 | 10/2009 |
| GB | 2293667 A | 4/1996 |
| JP | 06 019965 | 1/1994 |
| JP | 2001 125896 | 5/2001 |
| JP | 2002 024212 | 1/2002 |
| JP | 2003 517158 A | 5/2003 |
| JP | 2009 036999 | 2/2009 |
| KR | 10-2007-0057496 | 6/2007 |
| KR | 10-0776800 B1 | 11/2007 |
| KR | 10-2008-001227 | 2/2008 |
| KR | 10-0810500 B1 | 3/2008 |
| KR | 10 2008 109322 A | 12/2008 |
| KR | 10 2009 086805 A | 8/2009 |
| KR | 10-0920267 B1 | 10/2009 |
| KR | 10-2010-0032792 | 4/2010 |
| KR | 10 2011 0113414 A | 10/2011 |
| WO | WO 95/02221 | 1/1995 |
| WO | WO 97/26612 | 7/1997 |
| WO | WO 98/41956 | 9/1998 |
| WO | WO 99/01834 | 1/1999 |
| WO | WO 99/08238 | 2/1999 |
| WO | WO 99/56227 | 11/1999 |
| WO | WO 00/60435 | 10/2000 |
| WO | WO 00/60435 A3 | 10/2000 |
| WO | WO 02/073603 A1 | 9/2002 |
| WO | WO 2006/129967 A1 | 12/2006 |
| WO | WO 2008/085742 A2 | 7/2008 |
| WO | WO 2008/109835 A2 | 9/2008 |
| WO | WO 2011/088053 A2 | 7/2011 |

OTHER PUBLICATIONS

Cao et al.. "Adapting Ranking SVM to Document Retrieval". SIGIR '06, Aug. 6-11, 2006. Seattle, WA.
Alfred App, 2011, http://www.alfredapp.com/, 5 pages.
Ambite, JL., et al., "Design and Implementation of the CALO Query Manager," Copyright © 2006, American Association for Artificial Intelligence, (www.aaai.org), 8 pages.
Ambite, JL., et al., "Integration of Heterogeneous Knowledge Sources in the CALO Query Manager," 2005, The 4th International Conference on Ontologies, DataBases, and Applications of Semantics (ODBASE), Agia Napa, Cyprus, ttp://www.isi.edu/people/ambite/publications/integration_heterogeneous_knowledge_sources_calo_query_manager, 18 pages.
Belvin, R. et al., "Development of the HRL Route Navigation Dialogue System," 2001, In Proceedings of the First International Conference on Human Language Technology Research, Paper, Copyright © 2001 HRL Laboratories, LLC, http://citeseerx.ist.psu.edu/viewdoc/summary?doi=10.1.1.10.6538, 5 pages.
Berry, P. M., et al. "PTIME: Personalized Assistance for Calendaring," ACM Transactions on Intelligent Systems and Technology, vol. 2, No. 4, Article 40, Publication date: Jul. 2011, 40:1-22, 22 pages.
Bussler, C., et al., "Web Service Execution Environment (WSMX)," Jun. 3, 2005, W3C Member Submission, http://www.w3.org/Submission/WSMX, 29 pages.
Butcher, M., "EVI arrives in town to go toe-to-toe with Siri," Jan. 23, 2012, http://techcrunch.com/2012/01/23/evi-arrives-in-town-to-go-toe-to-toe-with-siri/, 2 pages.
Chen, Y., "Multimedia Siri Finds and Plays Whatever You Ask for," Feb. 9, 2012, http://www.psfk.com/2012/02/nnultimedia-siri.html, 9 pages.
Cheyer, A., "About Adam Cheyer," Sep. 17, 2012, http://www.adam.cheyer.com/about.html, 2 pages.
Cheyer, A., "A Perspective on AI & Agent Technologies for SCM," VerticalNet, 2001 presentation, 22 pages.
Cheyer, A. et al., "Spoken Language and Multimodal Applications for Electronic Realties," © Springer-Verlag London Ltd, Virtual Reality 1999, 3:1-15, 15 pages.
Cutkosky, M. R. et al., "PACT: An Experiment in Integrating Concurrent Engineering Systems," Journal, Computer, vol. 26 Issue 1, Jan. 1993, IEEE Computer Society Press Los Alamitos, CA, USA, http://dl.acm.org/citation.cfm?id=165320, 14 pages.
Domingue, J., et al., "Web Service Modeling Ontology (WSMO)—An Ontology for Semantic Web Services," Jun. 9-10, 2005, position paper at the W3C Workshop on Frameworks for Semantics in Web Services, Innsbruck, Austria, 6 pages.
Elio, R. et al., "On Abstract Task Models and Conversation Policies," http://webdocs.cs.ualberta.ca/~ree/publications/papers2/ATS.AA99.pdf, May 1999, 10 pages.
Ericsson, S. et al., "Software illustrating a unified approach to multimodality and multilinguality in the in-home domain," Dec. 22, 2006, Talk and Look: Tools for Ambient Linguistic Knowledge,

(56) References Cited

OTHER PUBLICATIONS http://www.talk-project.eurice.eu/fileadmin/talk/publications_public/deliverables_public/D1_6.pdf, 127 pages.

Evi, "Meet Evi: the one mobile app that provides solutions for your everyday problems," Feb. 8, 2012, http://www.evi.com/, 3 pages.

Feigenbaum, E., et al., "Computer-assisted Semantic Annotation of Scientific Life Works," 2007, http://tomgruber.org/writing/stanford-cs300.pdf, 22 pages.

Gannes, L., "Alfred App Gives Personalized Restaurant Recommendations," allthingsd.com, Jul. 18, 2011, http://allthingsd.com/20110718/alfred-app-gives-personalized-restaurant-recommendations/, 3 pages.

Gautier, P. O., et al. "Generating Explanations of Device Behavior Using Compositional Modeling and Causal Ordering," 1993, http://citeseerx.ist.psu.edu/viewdoc/summary?doi=10.1.1.42.8394, 9 pages.

Gervasio, M. T., et al., Active Preference Learning for Personalized Calendar Scheduling Assistancae, Copyright © 2005, http://www.ai.sri.com/~gervasio/pubs/gervasio-iui05.pdf, 8 pages.

Glass, A., "Explaining Preference Learning," 2006, http://cs229.stanford.edu/proj2006/Glass-ExplainingPreferenceLearning.pdf, 5 pages.

Glass, J., et al., "Multilingual Spoken-Language Understanding in the MIT Voyager System," Aug. 1995, http://groups.csail.mit.edu/sls/publications/1995/speechcomm95-voyager.pdf, 29 pages.

Goddeau, D., et al., "A Form-Based Dialogue Manager for Spoken Language Applications," Oct. 1996, http://phasedance.com/pdf/icslp96.pdf, 4 pages.

Goddeau, D., et al., "Galaxy: A Human-Language Interface to On-Line Travel Information," 1994 International Conference on Spoken Language Processing, Sep. 18-22, 1994, Pacific Convention Plaza Yokohama, Japan, 6 pages.

Gruber, T. R., et al., "An Ontology for Engineering Mathematics," In Jon Doyle, Piero Torasso, & Erik Sandewall, Eds., Fourth International Conference on Principles of Knowledge Representation and Reasoning, Gustav Stresemann Institut, Bonn, Germany, Morgan Kaufmann, 1994, http://www-ksl.stanford.edu/knowledge-sharing/papers/engmath.html, 22 pages.

Gruber, T. R., "A Translation Approach to Portable Ontology Specifications," Knowledge Systems Laboratory, Stanford University, Sep. 1992, Technical Report KSL 92-71, Revised Apr. 1993, 27 pages.

Gruber, T. R., "Automated Knowledge Acquisition for Strategic Knowledge," Knowledge Systems Laboratory, Machine Learning, 4, 293-336 (1989), 44 pages.

Gruber, T. R., "(Avoiding) the Travesty of the Commons," Presentation at NPUC 2006, New Paradigms for User Computing, IBM Almaden Research Center, Jul. 24, 2006. http://tomgruber.org/writing/avoiding-travestry.htm, 52 pages.

Gruber, T. R., "Big Think Small Screen: How semantic computing in the cloud will revolutionize the consumer experience on the phone," Keynote presentation at Web 3.0 conference, Jan. 27, 2010, http://tomgruber.org/writing/web30jan2010.htm, 41 pages.

Gruber, T. R., "Collaborating around Shared Content on the WWW," W3C Workshop on WWW and Collaboration, Cambridge, MA, Sep. 11, 1995, http://www.w3.org/Collaboration/Workshop/Proceedings/P9.html, 1 page.

Gruber, T. R., "Collective Knowledge Systems: Where the Social Web meets the Semantic Web," Web Semantics: Science, Services and Agents on the World Wide Web (2007), doi:10.1016/j.websem.2007.11.011, keynote presentation given at the 5th International Semantic Web Conference, Nov. 7, 2006, 19 pages.

Gruber, T. R., "Where the Social Web meets the Semantic Web," Presentation at the 5th International Semantic Web Conference, Nov. 7, 2006, 38 pages.

Gruber, T. R., "Despite our Best Efforts, Ontologies are not the Problem," AAAI Spring Symposium, Mar. 2008, http://tomgruber.org/writing/aaai-ss08.htm, 40 pages.

Gruber, T. R., "Enterprise Collaboration Management with Intraspect," Intraspect Software, Inc., Instraspect Technical White Paper Jul. 2001, 24 pages.

Gruber, T. R., "Every ontology is a treaty—a social agreement—among people with some common motive in sharing," Interview by Dr. Miltiadis D. Lytras, Official Quarterly Bulletin of AIS Special Interest Group on Semantic Web and Information Systems, vol. 1, Issue 3, 2004, http://www.sigsemis.org 1, 5 pages.

Gruber, T. R., et al., "Generative Design Rationale: Beyond the Record and Replay Paradigm," Knowledge Systems Laboratory, Stanford University, Dec. 1991, Technical Report KSL 92-59, Updated Feb. 1993, 24 pages.

Gruber, T. R., "Helping Organizations Collaborate, Communicate, and Learn," Presentation to NASA Ames Research, Mountain View, CA, Mar. 2003, http://tomgruber.org/writing/organizational-intelligence-talk.htm, 30 pages.

Gruber, T. R., "Intelligence at the Interface: Semantic Technology and the Consumer Internet Experience," Presentation at Semantic Technologies conference (SemTech08), May 20, 2008, http://tomgruber.org/writing.htm, 40 pages.

Gruber, T. R., Interactive Acquisition of Justifications: Learning "Why" by Being Told "What" Knowledge Systems Laboratory, Stanford University, Oct. 1990, Technical Report KSL 91-17, Revised Feb. 1991, 24 pages.

Gruber, T. R., "It Is What It Does: The Pragmatics of Ontology for Knowledge Sharing," (c) 2000, 2003, http://www.cidoc-crm.org/docs/symposium_presentations/gruber_cidoc-ontology-2003.pdf, 21 pages.

Gruber, T. R., et al., "Machine-generated Explanations of Engineering Models: A Compositional Modeling Approach," (1993) In Proc. International Joint Conference on Artificial Intelligence, http://citeseerx.ist.psu.edu/viewdoc/summary?doi=10.1.1.34.930, 7 pages.

Gruber, T. R., "2021: Mass Collaboration and the Really New Economy," TNTY Futures, the newsletter of the Next Twenty Years series, vol. 1, Issue 6, Aug. 2001, http://www.tnty.com/newsletter/futures/archive/v01-05business.html, 5 pages.

Gruber, T. R., et al.,"NIKE: A National Infrastructure for Knowledge Exchange," Oct. 1994, http://www.eit.com/papers/nike/nike.html and nike.ps, 10 pages.

Gruber, T. R., "Ontologies, Web 2.0 and Beyond," Apr. 24, 2007, Ontology Summit 2007, http://tomgruber.org/writing/ontolog-social-web-keynote.pdf, 17 pages.

Gruber, T. R., "Ontology of Folksonomy: A Mash-up of Apples and Oranges," Originally published to the web in 2005, Int'l Journal on Semantic Web & Information Systems, 3(2), 2007, 7 pages.

Gruber, T. R., "Siri, a Virtual Personal Assistant—Bringing Intelligence to the Interface," Jun. 16, 2009, Keynote presentation at Semantic Technologies conference, Jun. 2009. http://tomgruber.org/writing/semtech09.htm, 22 pages.

Gruber, T. R., "TagOntology," Presentation to Tag Camp, www.tagcamp.org, Oct. 29, 2005, 20 pages.

Gruber, T. R., et al., "Toward a Knowledge Medium for Collaborative Product Development," In Artificial Intelligence in Design 1992, from Proceedings of the Second International Conference on Artificial Intelligence in Design, Pittsburgh, USA, Jun. 22-25, 1992, 19 pages.

Gruber, T. R., "Toward Principles for the Design of Ontologies Used for Knowledge Sharing," In International Journal Human-Computer Studies 43, p. 907-928, substantial revision of paper presented at the International Workshop on Formal Ontology, Mar. 1993, Padova, Italy, available as Technical Report KSL 93-04, Knowledge Systems Laboratory, Stanford University, further revised Aug. 23, 1993, 23 pages.

Guzzoni, D., et al., "Active, A Platform for Building Intelligent Operating Rooms," Surgetica 2007 Computer-Aided Medical Interventions: tools and applications, pp. 191-198, Paris, 2007, Sauramps Médical, http://lsro.epfl.ch/page-68384-en.html, 8 pages.

Guzzoni, D., et al., "Active, A Tool for Building Intelligent User Interfaces," ASC 2007, Palma de Mallorca, http://lsro.epfl.ch/page-34241.html, 6 pages.

Guzzoni, D., et al., "A Unified Platform for Building Intelligent Web Interaction Assistants," Proceedings of the 2006 IEEE/WIC/ACM

(56) References Cited

OTHER PUBLICATIONS

International Conference on Web Intelligence and Intelligent Agent Technology, Computer Society, 4 pages.
Guzzoni, D., et al., "Modeling Human-Agent Interaction with Active Ontologies," 2007, AAAI Spring Symposium, Interaction Challenges for Intelligent Assistants, Stanford University, Palo Alto, California, 8 pages.
Hardawar, D., "Driving app Waze builds its own Siri for hands-free voice control," Feb. 9, 2012, http://venturebeat.com/2012/02/09/driving-app-waze-builds-its-own-siri-for-hands-free-voice-control/, 4 pages.
Intraspect Software, "The Intraspect Knowledge Management Solution: Technical Overview," http://tomgruber.org/writing/intraspect-whitepaper-1998.pdf, 18 pages.
Julia, L., et al., Un éditeur interactif de tableaux dessinés à main levée (An Interactive Editor for Hand-Sketched Tables), Traitement du Signal 1995, vol. 12, No. 6, 8 pages. No English Translation Available.
Karp, P. D., "A Generic Knowledge-Base Access Protocol," May 12, 1994, http://lecture.cs.buu.ac.th/~f50353/Document/gfp.pdf, 66 pages.
Lemon, O., et al., "Multithreaded Context for Robust Conversational Interfaces: Context-Sensitive Speech Recognition and Interpretation of Corrective Fragments," Sep. 2004, ACM Transactions on Computer-Human Interaction, vol. 11, No. 3, 27 pages.
Leong, L., et al., "CASIS: A Context-Aware Speech Interface System," IUI'05, Jan. 9-12, 2005, Proceedings of the 10th international conference on Intelligent user interfaces, San Diego, California, USA, 8 pages.
Lieberman, H., et al., "Out of context: Computer systems that adapt to, and learn from, context," 2000, IBM Systems Journal, vol. 39, Nos. 3/4, 2000, 16 pages.
Lin, B., et al., "A Distributed Architecture for Cooperative Spoken Dialogue Agents with Coherent Dialogue State and History," 1999, http://citeseerx.ist.psu.edu/viewdoc/summary?doi=10.1.1.42.272, 4 pages.
McGuire, J., et al., "SHADE: Technology for Knowledge-Based Collaborative Engineering," 1993, Journal of Concurrent Engineering: Applications and Research (CERA), 18 pages.
Meng, H., et al., "Wheels: A Conversational System in the Automobile Classified Domain," Oct. 1996, httphttp://citeseerx.ist.psu.edu/viewdoc/summary?doi=10.1.1.16.3022, 4 pages.
Milward, D., et al., "D2.2: Dynamic Multimodal Interface Reconfiguration," Talk and Look: Tools for Ambient Linguistic Knowledge, Aug. 8, 2006, http://www.ihmc.us/users/nblaylock/Pubs/Files/talk_d2.2.pdf, 69 pages.
Mitra, P., et al., "A Graph-Oriented Model for Articulation of Ontology Interdependencies," 2000, http://ilpubs.stanford.edu:8090/442/1/2000-20.pdf, 15 pages.
Moran, D. B., et al., "Multimodal User Interfaces in the Open Agent Architecture," Proc. of the 1997 International Conference on Intelligent User Interfaces (IUI97), 8 pages.
Mozer, M., "An Intelligent Environment Must be Adaptive," Mar./Apr. 1999, IEEE Intelligent Systems, 3 pages.
Mühlhäuser, M., "Context Aware Voice User Interfaces for Workflow Support," Darmstadt 2007, http://tuprints.ulb.tu-darmstadt.de/876/1/PhD.pdf, 254 pages.
Naone, E., "TR10: Intelligent Software Assistant," Mar.-Apr. 2009, Technology Review, http://www.technologyreview.com/printer_friendly_article.aspx?id=22117, 2 pages.
Neches, R., "Enabling Technology for Knowledge Sharing," Fall 1991, AI Magazine, pp. 37-56, (21 pages).
Nöth, E., et al., "Verbmobil: The Use of Prosody in the Linguistic Components of a Speech Understanding System," IEEE Transactions on Speech and Audio Processing, vol. 8, No. 5, Sep. 2000, 14 pages.
*Phoenix Solutions, Inc. v. West Interactive Corp.*, Document 40, Declaration of Christopher Schmandt Regarding the MIT Galaxy System dated Jul. 2, 2010, 162 pages.
Rice, J., et al., "Monthly Program: Nov. 14, 1995," The San Francisco Bay Area Chapter of ACM SIGCHI, http://www.baychi.org/calendar/19951114/, 2 pages.
Rice, J., et al., "Using the Web Instead of a Window System," Knowledge Systems Laboratory, Stanford University, (http://tomgruber.org/writing/ks1-95-69.pdf, Sep. 1995.) CHI '96 Proceedings: Conference on Human Factors in Computing Systems, Apr. 13-18, 1996, Vancouver, BC, Canada, 14 pages.
Rivlin, Z., et al., "Maestro: Conductor of Multimedia Analysis Technologies," 1999 SRI International, Communications of the Association for Computing Machinery (CACM), 7 pages.
Roddy, D., et al., "Communication and Collaboration in a Landscape of B2B eMarketplaces," VerticalNet Solutions, white paper, Jun. 15, 2000, 23 pages.
Seneff, S., et al., "A New Restaurant Guide Conversational System: Issues in Rapid Prototyping for Specialized Domains," Oct. 1996, citeseerx.ist.psu.edu/viewdoc/download?doi=10.1.1.16...rep..., 4 pages.
Sheth, A., et al., "Relationships at the Heart of Semantic Web: Modeling, Discovering, and Exploiting Complex Semantic Relationships," Oct. 13, 2002, Enhancing the Power of the Internet: Studies in Fuzziness and Soft Computing, SpringerVerlag, 38 pages.
Simonite, T., "One Easy Way to Make Siri Smarter," Oct. 18, 2011, Technology Review, http:// www.technologyreview.com/printer_friendly_article.aspx?id=38915, 2 pages.
Stent, A., et al., "The CommandTalk Spoken Dialogue System," 1999, http://acl.ldc.upenn.edu/P/P99/P99-1024.pdf, 8 pages.
Tofel, K., et al., "SpeakToIt: A personal assistant for older iPhones, iPads," Feb. 9, 2012, http://gigaom.com/apple/speaktoit-siri-for-older-iphones-ipads/, 7 pages.
Tucker, J., "Too lazy to grab your TV remote? Use Siri instead," Nov. 30, 2011, http://www.engadget.com/2011/11/30/too-lazy-to-grab-your-tv-remote-use-siri-instead/, 8 pages.
Tur, G., et al., "The CALO Meeting Speech Recognition and Understanding System," 2008, Proc. IEEE Spoken Language Technology Workshop, 4 pages.
Tur, G., et al., "The-CALO-Meeting-Assistant System," IEEE Transactions on Audio, Speech, and Language Processing, vol. 18, No. 6, Aug. 2010, 11 pages.
Vlingo InCar, "Distracted Driving Solution with Vlingo InCar," 2:38 minute video uploaded to YouTube by Vlingo Voice on Oct. 6, 2010, http://www.youtube.com/watch?v=Vqs8XfXxgz4, 2 pages.
Vlingo, "Vlingo Launches Voice Enablement Application on Apple App Store," Vlingo press release dated Dec. 3, 2008, 2 pages.
YouTube, "Knowledge Navigator," 5:34 minute video uploaded to YouTube by Knownav on Apr. 29, 2008, http://www.youtube.com/watch?v=QRH8eimU_20, 1 page.
YouTube,"Send Text, Listen to and Send E-Mail 'By Voice' www.voiceassist.com," 2:11 minute video uploaded to YouTube by VoiceAssist on Jul. 30, 2009, http://www.youtube.com/watch?v=0tEU61nHHA4, 1 page.
YouTube,"Text'nDrive App Demo—Listen and Reply to your Messages by Voice while Driving!," 1:57 minute video uploaded to YouTube by TextnDrive on Apr. 27, 2010, http://www.youtube.com/watch?v=WaGfzoHsAMw, 1 page.
YouTube, "Voice on the Go (BlackBerry)," 2:51 minute video uploaded to YouTube by VoiceOnTheGo on Jul. 27, 2009, http://www.youtube.com/watch?v=pJqpWgQS98w, 1 page.
Zue, V., "Conversational Interfaces: Advances and Challenges," Sep. 1997, http://www.cs.cmu.edu/~dod/papers/zue97.pdf, 10 pages.
Zue, V. W., "Toward Systems that Understand Spoken Language," Feb. 1994, ARPA Strategic Computing Institute, © 1994 IEEE, 9 pages.
International Search Report and Written Opinion dated Nov. 29, 2011, received in International Application No. PCT/US2011/20861, which corresponds to U.S. Appl. No. 12/987,982, 15 pages (Thomas Robert Gruber).
Martin, D., et al., "The Open Agent Architecture: A Framework for building distributed software systems," Jan.-Mar. 1999, Applied Artificial Intelligence: An International Journal, vol. 13, No. 1-2, http://adam.cheyer.com/papers/oaa.pdf, 38 pages.

(56) References Cited

OTHER PUBLICATIONS

Acero, A., et al., "Environmental Robustness in Automatic Speech Recognition," International Conference on Acoustics, Speech, and Signal Processing (ICASSP'90), Apr. 3-6, 1990, 4 pages.

Acero, A., et al., "Robust Speech Recognition by Normalization of The Acoustic Space," International Conference on Acoustics, Speech, and Signal Processing, 1991, 4 pages.

Ahlbom, G., et al., "Modeling Spectral Speech Transitions Using Temporal Decomposition Techniques," IEEE International Conference of Acoustics, Speech, and Signal Processing (ICASSP'87), Apr. 1987, vol. 12, 4 pages.

Aikawa, K., "Speech Recognition Using Time-Warping Neural Networks," Proceedings of the 1991 IEEE Workshop on Neural Networks for Signal Processing, Sep. 30 to Oct. 1, 1991, 10 pages.

Anastasakos, A., et al., "Duration Modeling in Large Vocabulary Speech Recognition," International Conference on Acoustics, Speech, and Signal Processing (ICASSP'95), May 9-12, 1995, 4 pages.

Anderson, R. H., "Syntax-Directed Recognition of Hand-Printed Two-Dimensional Mathematics," In Proceedings of Symposium on Interactive Systems for Experimental Applied Mathematics: Proceedings of the Association for Computing Machinery Inc. Symposium, © 1967, 12 pages.

Ansari, R., et al., "Pitch Modification of Speech using a Low-Sensitivity Inverse Filter Approach," IEEE Signal Processing Letters, vol. 5, No. 3, Mar. 1998, 3 pages.

Anthony, N. J., et al., "Supervised Adaption for Signature Verification System," Jun. 1, 1978, IBM Technical Disclosure, 3 pages.

Apple Computer, "Guide Maker User's Guide," © Apple Computer, Inc., Apr. 27, 1994, 8 pages.

Apple Computer, "Introduction to Apple Guide," © Apple Computer, Inc., Apr. 28, 1994, 20 pages.

Asanović, K., et al., "Experimental Determination of Precision Requirements for Back-Propagation Training of Artificial Neural Networks," In Proceedings of the 2nd International Conference of Microelectronics for Neural Networks, 1991, www.ICSI.Berkeley. EDU, 7 pages.

Atal, B. S., "Efficient Coding of LPC Parameters by Temporal Decomposition," IEEE International Conference on Acoustics, Speech, and Signal Processing (ICASSP'83), Apr. 1983, 4 pages Bahl, L. R., et al., "Acoustic Markov Models Used in the Tangora Speech Recognition System," In Proceeding of International Conference on Acoustics, Speech, and Signal Processing (ICASSP'88), Apr. 11-14, 1988, vol. 1, 4 pages.

Bahl, L. R., et al., "A Maximum Likelihood Approach to Continuous Speech Recognition," IEEE Transaction on Pattern Analysis and Machine Intelligence, vol. PAMI-5, No. 2, Mar. 1983, 13 pages.

Bahl, L. R., et al., "A Tree-Based Statistical Language Model for Natural Language Speech Recognition," IEEE Transactions on Acoustics, Speech and Signal Processing, vol. 37, Issue 7, Jul. 1989, 8 pages.

Bahl, L. R., et al., "Large Vocabulary Natural Language Continuous Speech Recognition," In Proceedings of 1989 International Conference on Acoustics, Speech, and Signal Processing, May 23-26, 1989, vol. 1, 6 pages.

Bahl, L. R., et al, "Multonic Markov Word Models for Large Vocabulary Continuous Speech Recognition," IEEE Transactions on Speech and Audio Processing, vol. 1, No. 3, Jul. 1993, 11 pages.

Bahl, L. R., et al., "Speech Recognition with Continuous-Parameter Hidden Markov Models," In Proceeding of International Conference on Acoustics, Speech, and Signal Processing (ICASSP'88), Apr. 11-14, 1988, vol. 1, 8 pages.

Banbrook, M., "Nonlinear Analysis of Speech from a Synthesis Perspective," A thesis submitted for the degree of Doctor of Philosophy, The University of Edinburgh, Oct. 15, 1996, 35 pages.

Belaid, A., et al., "A Syntactic Approach for Handwritten Mathematical Formula Recognition," IEEE Transactions on Pattern Analysis and Machine Intelligence, vol. PAMI-6, No. 1, Jan. 1984, 7 pages.

Bellegarda, E. J., et al., "On-Line Handwriting Recognition Using Statistical Mixtures," Advances in Handwriting and Drawings: A Multidisciplinary Approach, Europia, 6th International IGS Conference on Handwriting and Drawing, Paris-France, Jul. 1993, 11 pages.

Bellegarda, J. R., "A Latent Semantic Analysis Framework for Large-Span Language Modeling," 5th European Conference on Speech, Communication and Technology, (EUROSPEECH'97), Sep. 22-25, 1997, 4 pages.

Bellegarda, J. R., "A Multispan Language Modeling Framework for Large Vocabulary Speech Recognition," IEEE Transactions on Speech and Audio Processing, vol. 6; No. 5, Sep. 1998, 12 pages.

Bellegarda, J. R., et al., "A Novel Word Clustering Algorithm Based on Latent Semantic Analysis," in Proceedings of the IEEE International Conference on Acoustics, Speech, and Signal Processing (ICASSP'96), vol. 1, 4 pages.

Bellegarda, J. R., et al., "Experiments Using Data Augmentation for Speaker Adaptation," International Conference on Acoustics, Speech, and Signal Processing (ICASSP'95), May 9-12, 1995, 4 pages.

Bellegarda, J. R., "Exploiting Both Local and Global Constraints for Multi-Span Statistical Language Modeling," Proceeding of the 1998 IEEE International Conference on Acoustics, Speech, and Signal Processing (ICASSP'98), vol. 2, May 12-15, 1998, 5 pages.

Bellegarda, J. R., "Exploiting Latent Semantic Information in Statistical Language Modeling," In Proceedings of the IEEE, Aug. 2000, vol. 88, No. 8, 18 pages.

Bellegarda, J. R., "Interaction-Driven Speech Input—A Data-Driven Approach to the Capture of Both Local and Global Language Constraints," 1992, 7 pages, available at http://old.sigchi.org/bulletin/1998.2/bellegarda.html.

Bellegarda, J. R., "Large Vocabulary Speech Recognition with Multispan Statistical Language Models," IEEE Transactions on Speech and Audio Processing, vol. 8, No. 1, Jan. 2000, 9 pages.

Bellegarda, J. R., et al., "Performance of the IBM Large Vocabulary Continuous Speech Recognition System on the ARPA Wall Street Journal Task," Signal Processing VII: Theories and Applications, © 1994 European Association for Signal Processing, 4 pages.

Bellegarda, J. R., et al., "The Metamorphic Algorithm: A Speaker Mapping Approach to Data Augmentation," IEEE Transactions on Speech and Audio Processing, vol. 2, No. 3, Jul. 1994, 8 pages.

Black, A. W., et al., "Automatically Clustering Similar Units for Unit Selection in Speech Synthesis," In Proceedings of Eurospeech 1997, vol. 2, 4 pages.

Blair, D. C., et al., "An Evaluation of Retrieval Effectiveness for a Full-Text Document-Retrieval System," Communications of the ACM, vol. 28, No. 3, Mar. 1985, 11 pages.

Briner, L. L., "Identifying Keywords in Text Data Processing," In Zelkowitz, Marvin V., ED, Directions and Challenges, 15th Annual Technical Symposium, Jun. 17, 1976, Gaithersbury, Maryland, 7 pages.

Bulyko, I. et al., "Error-Correction Detection and Response Generation in a Spoken Dialogue System," © 2004 Elsevier B.V., specom. 2004.09.009, 18 pages.

Bulyko, I., et al., "Joint Prosody Prediction and Unit Selection for Concatenative Speech Synthesis," Electrical Engineering Department, University of Washington, Seattle, 2001, 4 pages.

Bussey, H. E., et al., "Service Architecture, Prototype Description, and Network Implications of a Personalized Information Grazing Service," INFOCOM'90, Ninth Annual Joint Conference of the IEEE Computer and Communication Societies, Jun. 3-7 1990, http://slrohall.com/publications/, 8 pages.

Buzo, A., et al., "Speech Coding Based Upon Vector Quantization," IEEE Transactions on Acoustics, Speech, and Signal Processing, vol. Assp-28, No. 5, Oct. 1980, 13 pages.

Caminero-Gil, J., et al., "Data-Driven Discourse Modeling for Semantic Interpretation," In Proceedings of the IEEE International Conference on Acoustics, Speech, and Signal Processing, May 7-10, 1996, 6 pages.

Cawley, G. C., "The Application of Neural Networks to Phonetic Modelling," PhD Thesis, University of Essex, Mar. 1996, 13 pages.

Chang, S., et al., "A Segment-based Speech Recognition System for Isolated Mandarin Syllables," Proceedings TENCON '93, IEEE Region 10 conference on Computer, Communication, Control and Power Engineering, Oct. 19-21, 1993, vol. 3, 6 pages.

(56) References Cited

OTHER PUBLICATIONS

Cheyer, A., "A Perspective on AI & Agent Technologies for SCM," VerticalNet, 2001 presentation, 22 pages.
Conklin, J., "Hypertext: An Introduction and Survey," Computer Magazine, Sep. 1987, 25 pages.
Connolly, F. T., et al., "Fast Algorithms for Complex Matrix Multiplication Using Surrogates," IEEE Transactions on Acoustics, Speech, and Signal Processing, Jun. 1989, vol. 37, No. 6, 13 pages.
Cox, R. V., et al., "Speech and Language Processing for Next-Millennium Communications Services," Proceedings of the IEEE, vol. 88, No. 8, Aug. 2000, 24 pages.
Davis, Z., et al., "A Personal Handheld Multi-Modal Shopping Assistant," 2006 IEEE, 9 pages.
Deerwester, S., et al., "Indexing by Latent Semantic Analysis," Journal of the American Society for Information Science, vol. 41, No. 6, Sep. 1990, 19 pages.
Deller, Jr., J. R., et al., "Discrete-Time Processing of Speech Signals," © 1987 Prentice Hall, ISBN: 0-02-328301-7, 14 pages.
Digital Equipment Corporation, "Open VMS Software Overview," Dec. 1995, software manual, 159 pages.
Donovan, R. E., "A New Distance Measure for Costing Spectral Discontinuities in Concatenative Speech Synthesisers," 2001, http://citeseerx.ist.psu.edu/viewdoc/summary?doi=10.1.1.21.6398 4 pages.
Frisse, M. E., "Searching for Information in a Hypertext Medical Handbook," Communications of the ACM, vol. 31, No. 7, Jul. 1988, 8 pages.
Goldberg, D., et al., "Using Collaborative Filtering to Weave an Information Tapestry," Communications of the ACM, vol. 35, No. 12, Dec. 1992, 10 pages.
Gorin, A. L., et al., "On Adaptive Acquisition of Language," International Conference on Acoustics, Speech, and Signal Processing (ICASSP'90), vol. 1, Apr. 3-6, 1990, 5 pages.
Gotoh, Y., et al., "Document Space Models Using Latent Semantic Analysis," in Proceedings of Eurospeech, 1997, 4 pages.
Gray, R. M., "Vector Quantization," IEEE ASSP Magazine, Apr. 1984, 26 pages.
Harris, F. J., "On the Use of Windows for Harmonic Analysis with the Discrete Fourier Transform," In Proceedings of the IEEE, vol. 66, No. 1, Jan. 1978, 34 pages.
Helm, R., et al., "Building Visual Language Parsers," in Proceedings of CHI'91 Proceedings of the SIGCHI Conference on Human Factors in Computing Systems, 8 pages
Hermansky, H., "Perceptual Linear Predictive (PLP) Analysis of Speech," Journal of the Acoustical Society of America, vol. 87, No. 4, Apr. 1990, 15 pages.
Hermansky, H., "Recognition of Speech in Additive and Convolutional Noise Based on Rasta Spectral Processing," In proceedings of IEEE International Conference on Acoustics, speech, and Signal Processing (ICASSP'93), Apr. 27-30, 1993, 4 pages.
Hoehfeld M., et al., "Learning with Limited Numerical Precision Using the Cascade-Correlation Algorithm," IEEE Transactions on Neural Networks, vol. 3, No. 4, Jul. 1992, 18 pages.
Holmes, J. N., "Speech Synthesis and Recognition—Stochastic Models for Word Recognition," Speech Synthesis and Recognition, Published by Chapman & Hall, London, ISBN 0 412 53430 4, © 1998 J. N. Holmes, 7 pages.
Hon, H.W., et al., "CMU Robust Vocabulary-Independent Speech Recognition System," IEEE International Conference on Acoustics, Speech, and Signal Processing (ICASSP-91), Apr. 14-17, 1991, 4 pages.
IBM Technical Disclosure Bulletin, "Speech Editor," vol. 29, No. 10, Mar. 10, 1987, 3 pages.
IBM Technical Disclosure Bulletin, "Integrated Audio-Graphics User Interface," vol. 33, No. 11, Apr. 1991, 4 pages.
IBM Technical Disclosure Bulletin, "Speech Recognition with Hidden Markov Models of Speech Waveforms," vol. 34, No. 1, Jun. 1991, 10 pages.
Iowegian International, "FIR Filter Properties," dspGuro, Digital Signal Processing Central, http://www.dspguru.com/dsp/taqs/fir/properties, downloaded on Jul. 28, 2010, 6 pages.
Jacobs, P. S., et al., "Scisor: Extracting Information from On-Line News," Communications of the ACM, vol. 33, No. 11, Nov. 1990, 10 pages.
Jelinek, F., "Self-Organized Language Modeling for Speech Recognition," Readings in Speech Recognition, edited by Alex Waibel and Kai-Fu Lee, May 15, 1990, © 1990 Morgan Kaufmann Publishers, Inc., ISBN: 1-55860-124-4, 63 pages.
Jennings, A., et al., "A Personal News Service Based on a User Model Neural Network," IEICE Transactions on Information and Systems, vol. E75-D, No. 2, Mar. 1992, Tokyo, JP, 12 pages.
Ji, T., et al., "A Method for Chinese Syllables Recognition based upon Sub-syllable Hidden Markov Model," 1994 International Symposium on Speech, Image Processing and Neural Networks, Apr. 13-16, 1994, Hong Kong, 4 pages.
Jones, J., "Speech Recognition for Cyclone," Apple Computer, Inc., E.R.S., Revision 2.9, Sep. 10, 1992, 93 pages.
Katz, S. M., "Estimation of Probabilities from Sparse Data for the Language Model Component of a Speech Recognizer," IEEE Transactions on Acoustics, Speech, and Signal Processing, vol. ASSP-35, No. 3, Mar. 1987, 3 pages.
Kitano, H., "PhiDM-Dialog, an Experimental Speech-to-Speech Dialog Translation System," Jun. 1991 Computer, vol. 24, No. 6, 13 pages.
Klabbers, E., et al., "Reducing Audible Spectral Discontinuities," IEEE Transactions on Speech and Audio Processing, vol. 9, No. 1, Jan. 2001, 13 pages.
Klatt, D. H., "Linguistic Uses of Segmental Duration in English: Acoustic and Perpetual Evidence," Journal of the Acoustical Society of America, vol. 59, No. 5, May 1976, 16 pages.
Kominek, J., et al., "Impact of Durational Outlier Removal from Unit Selection Catalogs," 5th ISCA Speech Synthesis Workshop, Jun. 14-16, 2004, 6 pages.
Kubala, F., et al., "Speaker Adaptation from a Speaker-Independent Training Corpus," International Conference on Acoustics, Speech, and Signal Processing (ICASSP'90), Apr. 3-6, 1990, 4 pages.
Kubala, F., et al., "The Hub and Spoke Paradigm for CSR Evaluation," Proceedings of the Spoken Language Technology Workshop, Mar. 6-8, 1994, 9 pages.
Lee, K.F., "Large-Vocabulary Speaker-Independent Continuous Speech Recognition: The Sphinx System," Apr. 18, 1988, Partial fulfillment of the requirements for the degree of Doctor of Philosophy, Computer Science Department, Carnegie Mellon University, 195 pages.
Lee, L., et al., "A Real-Time Mandarin Dictation Machine for Chinese Language with Unlimited Texts and Very Large Vocabulary," International Conference on Acoustics, Speech and Signal Processing, vol. 1, Apr. 3-6, 1990, 5 pages.
Lee, L, et al., "Golden Mandarin(II)—An Improved Single-Chip Real-Time Mandarin Dictation Machine for Chinese Language with Very Large Vocabulary," 0-7803-0946-4-93 © 1993 IEEE, 4 pages.
Lee, L, et al., "Golden Mandarin(II)—An Intelligent Mandarin Dictation Machine for Chinese Character Input with Adaptation/Learning Functions," International Symposium on Speech, Image Processing and Neural Networks, Apr. 13-16, 1994, Hong Kong, 5 pages.
Lee, L., et al., "System Description of Golden Mandarin (I) Voice Input for Unlimited Chinese Characters," International Conference on Computer Processing of Chinese & Oriental Languages, vol. 5, Nos. 3 & 4, Nov. 1991, 16 pages.
Lin, C.H., et al., "A New Framework for Recognition of Mandarin Syllables With Tones Using Sub-syllabic Unites," IEEE International Conference on Acoustics, Speech, and Signal Processing (ICASSP-93), Apr. 27-30, 1993, 4 pages.
Linde, Y., et al., "An Algorithm for Vector Quantizer Design," IEEE Transactions on Communications, vol. 28, No. 1, Jan. 1980, 12 pages.
Liu, F.H., et al., "Efficient Joint Compensation of Speech for the Effects of Additive Noise and Linear Filtering," IEEE International Conference of Acoustics, Speech, and Signal Processing, ICASSP-92, Mar. 23-26, 1992, 4 pages.

(56) References Cited

OTHER PUBLICATIONS

Logan, B., "Mel Frequency Cepstral Coefficients for Music Modeling," in International Symposium on Music Information Retrieval, 2000, 2 pages.

Lowerre, B. T., "The-Harpy Speech Recognition System," Doctoral Dissertation, Department of Computer Science, Carnegie Mellon University, Apr. 1976, 20 pages.

Maghbouleh, a., "An Empirical Comparison of Automatic Decision Tree and Linear Regression Models for Vowel Durations," Revised version of a paper presented at the Computational Phonology in Speech Technology workshop, 1996 annual meeting of the Association for Computational Linguistics in Santa Cruz, California, 7 pages.

Markel, J. D., et al., "Linear Prediction of Speech," Springer-Verlag, Berlin Heidelberg New York 1976, 12 pages.

Morgan, B., "Business Objects," (Business Objects for Windows) Business Objects Inc., DBMS Sep. 1992, vol. 5, No. 10, 3 pages.

Mountford, S. J., et al., "Talking and Listening to Computers," The Art of Human-Computer Interface Design, Copyright © 1990 Apple Computer, Inc. Addison-Wesley Publishing Company, Inc., 17 pages.

Murty, K. S. R., et al., "Combining Evidence from Residual Phase and MFCC Features for Speaker Recognition," IEEE Signal Processing Letters, vol. 13, No. 1, Jan. 2006, 4 pages.

Murveit H. et al., "Integrating Natural Language Constraints into HMM-based Speech Recognition," 1990 International Conference on Acoustics, Speech, and Signal Processing, Apr. 3-6, 1990, 5 pages.

Nakagawa, S., et al., "Speaker Recognition by Combining MFCC and Phase Information," IEEE International Conference on Acoustics Speech and Signal Processing (ICASSP), Mar. 14-19, 2010, 4 pages.

Niesler, T. R., et al., "A Variable-Length Category-Based N-Gram Language Model," IEEE International Conference on Acoustics, Speech, and Signal Processing (ICASSP'96), vol. 1, May 7-10, 1996, 6 pages.

Papadimitriou, C. H., et al., "Latent Semantic Indexing: A Probabilistic Analysis," Nov. 14, 1997, http://citeseerx.ist.psu.edu/messages/downloadsexceeded.html, 21 pages.

Parsons, T. W., "Voice and Speech Processing," Linguistics and Technical Fundamentals, Articulatory Phonetics and Phonemics, © 1987 McGraw-Hill, Inc., ISBN: 0-07-0485541-0, 5 pages.

Parsons, T. W., "Voice and Speech Processing," Pitch and Formant Estimation, © 1987 McGraw-Hill, Inc., ISBN: 0-07-0485541-0, 15 pages.

Picone, J., "Continuous Speech Recognition Using Hidden Markov Models," IEEE ASSP Magazine, vol. 7, No. 3, Jul. 1990, 16 pages.

Rabiner, L. R., et al., "Fundamental of Speech Recognition," © 1993 AT&T, Published by Prentice-Hall, Inc., ISBN: 0-13-285826-6, 17 pages.

Rabiner, L. R., et al., "Note on the Properties of a Vector Quantizer for LPC Coefficients," The Bell System Technical Journal, vol. 62, No. 8, Oct. 1983, 9 pages.

Ratcliffe, M., "ClearAccess 2.0 allows SQL searches off-line," (Structured Query Language), ClearAcess Corp., MacWeek Nov. 16, 1992, vol. 6, No. 41, 2 pages.

Remde, J. R., et al., "SuperBook: An Automatic Tool for Information Exploration-Hypertext?," In Proceedings of Hypertext'87 papers, Nov. 13-15, 1987, 14 pages.

Reynolds, C. F., "On-Line Reviews: A New Application of the HICOM Conferencing System," IEE Colloquium on Human Factors in Electronic Mail and Conferencing Systems, Feb. 3, 1989, 4 pages.

Rigoll, G., "Speaker Adaptation for Large Vocabulary Speech Recognition Systems Using Speaker Markov Models," International Conference on Acoustics, Speech, and Signal Processing (ICASSP'89), May 23-26, 1989, 4 pages.

Riley, M. D., "Tree-Based Modelling of Segmental Durations," Talking Machines Theories, Models, and Designs, 1992 © Elsevier Science Publishers B.V., North-Holland, ISBN: 08-444-89115.3, 15 pages.

Rivoira, S., et al., "Syntax and Semantics in a Word-Sequence Recognition System," IEEE International Conference on Acoustics, Speech, and Signal Processing (ICASSP'79), Apr. 1979, 5 pages.

Roddy, D., et al., "Communication and Collaboration in a Landscape of B2B eMarketplaces," VerticalNet Solutions, white paper, Jun. 15, 2000, 24 pages.

Rosenfeld, R., "A Maximum Entropy Approach to Adaptive Statistical Language Modelling," Computer Speech and Language, vol. 10, No. 3, Jul. 1996, 25 pages.

Roszkiewicz, A., "Extending your Apple," Back Talk—Lip Service, A+ Magazine, The Independent Guide for Apple Computing, vol. 2, No. 2, Feb. 1984, 5 pages.

Sakoe, H., et al., "Dynamic Programming Algorithm Optimization for Spoken Word Recognition," IEEE Transactins on Acoustics, Speech, and Signal Processing, Feb. 1978, vol. ASSP-26 No. 1, 8 pages.

Salton, G., et al., "On the Application of Syntactic Methodologies in Automatic Text Analysis," Information Processing and Management, vol. 26, No. 1, Great Britain 1990, 22 pages.

Savoy, J., "Searching Information in Hypertext Systems Using Multiple Sources of Evidence," International Journal of Man-Machine Studies, vol. 38, No. 6, Jun. 1993, 15 pages.

Scagliola, C., "Language Models and Search Algorithms for Real-Time Speech Recognition," International Journal of Man-Machine Studies, vol. 22, No. 5, 1985, 25 pages.

Schmandt, C., et al., "Augmenting a Window System with Speech Input," IEEE Computer Society, Computer Aug. 1990, vol. 23, No. 8, 8 pages.

Schütze, H., "Dimensions of Meaning," Proceedings of Supercomputing'92 Conference, Nov. 16-20, 1992, 10 pages.

Sheth B., et al., "Evolving Agents for Personalized Information Filtering," in Proceedings of the Ninth Conference on Artificial Intelligence for Applications, Mar. 1-5, 1993, 9 pages.

Shikano, K., et al., "Speaker Adaptation Through Vector Quantization," IEEE International Conference on Acoustics, Speech, and Signal Processing (ICASSP'86), vol. 11, Apr. 1986, 4 pages.

Sigurdsson, S., et al., "Mel Frequency Cepstral Coefficients: An Evaluation of Robustness of MP3 Encoded Music," In Proceedings of the 7th International Conference on Music Information Retrieval (ISMIR), 2006, 4 pages.

Silverman, K. E. A., et al., "Using a Sigmoid Transformation for Improved Modeling of Phoneme Duration," Proceedings of the IEEE International Conference on Acoustics, Speech, and Signal Processing, Mar. 15-19, 1999, 5 pages.

SRI2009, "SRI Speech: Products: Software Development Kits: EduSpeak," 2009, 2 pages, available at http://web.archive.org/web/20090828084033/http://www.speechatsri.com/products/eduspeak.shtml.

Tenenbaum, A.M., et al., "Data Structure Using Pascal," 1981 Prentice-Hall, Inc., 34 pages.

Tsai, W.H., et al., "Attributed Grammar—A Tool for Combining Syntactic and Statistical Approaches to Pattern Recognition," IEEE Transactions on Systems, Man, and Cybernetics, vol. SMC-10, No. 12, Dec. 1980, 13 pages.

Udell, J., "Computer Telephony," Byte, vol. 19, No. 7, Jul. 1, 1994, 9 pages.

van Santen, J. P. H., "Contextual Effects on Vowel Duration," Journal Speech Communication, vol. 11, No. 6, Dec. 1992, 34 pages.

Vepa, J., et al., "New Objective Distance Measures for Spectral Discontinuities in Concatenative Speech Synthesis," in Proceedings of the IEEE 2002 Workshop on Speech Synthesis, 4 pages.

Verschelde, J., "Matlab Lecture 8. Special Matrices in Matlab," Nov. 23, 2005, UIC Dept. of Math., Stat.. & C.S., MCS 320, Introduction to Symbolic Computation, 4 pages.

Vingron, M. "Near-Optimal Sequence Alignment," Deutsches Krebsforschungszentrum (DKFZ), Abteilung Theoretische Bioinformatik, Heidelberg, Germany, Jun. 1996, 20 pages.

Werner, S., et al., "Prosodic Aspects of Speech," Université de Lausanne, Switzerland, 1994, Fundamentals of Speech Synthesis and Speech Recognition: Basic Concepts, State of the Art, and Future Challenges, 18 pages.

Wikipedia, "Mel Scale," Wikipedia, the free encyclopedia, last modified page date: Oct. 13, 2009, http://en.wikipedia.org/wiki/Mel_scale, 2 pages.

(56) References Cited

OTHER PUBLICATIONS

Wikipedia, "Minimum Phase," Wikipedia, the free encyclopedia, last modified page date: Jan. 12, 2010, http://en.wikipedia.org/wiki/Minimum_phase, 8 pages.
Wolff, M., "Poststructuralism and the ARTFUL Database: Some Theoretical Considerations," Information Technology and Libraries, vol. 13, No. 1, Mar. 1994, 10 pages.
Wu, M., "Digital Speech Processing and Coding," ENEE408G Capstone-Multimedia Signal Processing, Spring 2003, Lecture-2 course presentation, University of Maryland, College Park, 8 pages.
Wu, M., "Speech Recognition, Synthesis, and H.C.I.," ENEE408G Capstone-Multimedia Signal Processing, Spring 2003, Lecture-3 course presentation, University of Maryland, College Park, 11 pages.
Wyle, M. F., "A Wide Area Network Information Filter," In Proceedings of First International Conference on Artificial Intelligence on Wall Street, Oct. 9-11, 1991, 6 pages.
Yankelovich, N., et al., "Intermedia: The Concept and the Construction of a Seamless Information Environment," COMPUTER Magazine, Jan. 1988, © 1988 IEEE, 16 pages.
Yoon, K., et al., "Letter-to-Sound Rules for Korean," Department of Linguistics, The Ohio State University, 2002, 4 pages.
Zhao, Y., "An Acoustic-Phonetic-Based Speaker Adaptation Technique for Improving Speaker-Independent Continuous Speech Recognition," IEEE Transactions on Speech and Audio Processing, vol. 2, No. 3, Jul. 1994, 15 pages.
Zovato, E., et al., "Towards Emotional Speech Synthesis: A Rule Based Approach," 5th ISCA Speech Synthesis Workshop—Pittsburgh, Jun. 14-16, 2004, 2 pages.
International Search Report dated Nov. 9, 1994, received in International Application No. PCT/US1993/12666, which corresponds to U.S. Appl. No. 07/999,302, 8 pages (Robert Don Strong).
International Preliminary Examination Report dated Mar. 1, 1995, received in International Application No. PCT/US1993/12666, which corresponds to U.S. Appl. No. 07/999,302, 5 pages (Robert Don Strong).
International Preliminary Examination Report dated Apr. 10, 1995, received in International Application No. PCT/US1993/12637, which corresponds to U.S. Appl. No. 07/999,354, 7 pages (Alejandro Acero).
International Search Report dated Feb. 8, 1995, received in International Application No. PCT/US1994/11011, which corresponds to U.S. Appl. No. 08/129,679, 7 pages (Yen-Lu Chow).
International Preliminary Examination Report dated Feb. 28, 1996, received in International Application No. PCT/US1994/11011, which corresponds to U.S. Appl. No. 08/129,679, 4 pages (Yen-Lu Chow).
Written Opinion dated Aug. 21, 1995, received in International Application No. PCT/US1994/11011, which corresponds to U.S. Appl. No. 08/129,679, 4 pages (Yen-Lu Chow).
International Search Report dated Nov. 8, 1995, received in International Application No. PCT/US1995/08369, which corresponds to U.S. Appl. No. 08/271,639, 6 pages (Peter V. De Souza).
International Preliminary Examination Report dated Oct. 9, 1996, received in International Application No. PCT/US1995/08369, which corresponds to U.S. Appl. No. 08/271,639, 4 pages (Peter V. De Souza).
Agnäs, MS., et al., "Spoken Language Translator: First-Year Report," Jan. 1994, SICS (ISSN 0283-3638), SRI and Telia Research AB, 161 pages.
Allen, J., "Natural Language Understanding," 2nd Edition, Copyright © 1995 by The Benjamin/Cummings Publishing Company, Inc., 671 pages.
Alshawi, H., et al., "CLARE: A Contextual Reasoning and Cooperative Response Framework for the Core Language Engine," Dec. 1992, SRI International, Cambridge Computer Science Research Centre, Cambridge, 273 pages.
Alshawi, H., et al., "Declarative Derivation of Database Queries from Meaning Representations," Oct. 1991, Proceedings of the BANKAI Workshop on Intelligent Information Access, 12 pages.
Alshawi H., et al., "Logical Forms in the Core Language Engine," 1989, Proceedings of the 27th Annual Meeting of the Association for Computational Linguistics, 8 pages.
Alshawi, H., et al., "Overview of the Core Language Engine," Sep. 1988, Proceedings of Future Generation Computing Systems, Tokyo, 13 pages.
Alshawi, H., "Translation and Monotonic Interpretation/Generation," Jul. 1992, SRI International, Cambridge Computer Science Research Centre, Cambridge, 18 pages, http://www.cam.sri.com/tr/crc024/paper.ps.Z 1992.
Appelt, D., et al., "Fastus: A Finite-state Processor for Information Extraction from Real-world Text," 1993, Proceedings of IJCAI, 8 pages.
Appelt, D., et al., "SRI: Description of the JV-FASTUS System Used for MUC-5," 1993, SRI International, Artificial Intelligence Center, 19 pages.
Appelt, D., et al., SRI International Fastus System MUC-6 Test Results and Analysis, 1995, SRI International, Menlo Park, California, 12 pages.
Archbold, A., et al., "A Team User's Guide," Dec. 21, 1981, SRI International, 70 pages.
Bear, J., et al., "A System for Labeling Self-Repairs in Speech," Feb. 22, 1993, SRI International, 9 pages.
Bear, J., et al., "Detection and Correction of Repairs in Human-Computer Dialog," May 5, 1992, SRI International, 11 pages.
Bear, J., et al., "Integrating Multiple Knowledge Sources for Detection and Correction of Repairs in Human-Computer Dialog," 1992, Proceedings of the 30th annual meeting on Association for Computational Linguistics (ACL), 8 pages.
Bear, J., et al., "Using Information Extraction to Improve Document Retrieval," 1998, SRI International, Menlo Park, California, 11 pages.
Berry, P., et al., "Task Management under Change and Uncertainty Constraint Solving Experience with the CALO Project," 2005, Proceedings of CP'05 Workshop on Constraint Solving under Change, 5 pages.
Bobrow, R. et al., "Knowledge Representation for Syntactic/Semantic Processing," From: AAA-80 Proceedings. Copyright © 1980, AAAI, 8 pages.
Bouchou, B., et al., "Using Transducers in Natural Language Database Query," Jun. 17-19, 1999, Proceedings of 4th International Conference on Applications of Natural Language to Information Systems, Austria, 17 pages.
Bratt, H., et al., "The SRI Telephone-based ATIS System," 1995, Proceedings of ARPA Workshop on Spoken Language Technology, 3 pages.
Burke, R., et al., "Question Answering from Frequently Asked Question Files," 1997, AI Magazine, vol. 18, No. 2, 10 pages.
Burns, A., et al., "Development of a Web-Based Intelligent Agent for the Fashion Selection and Purchasing Process via Electronic Commerce," Dec. 31, 1998, Proceedings of the Americas Conference on Information system (AMCIS), 4 pages.
Carter, D., "Lexical Acquisition in the Core Language Engine," 1989, Proceedings of the Fourth Conference of the European Chapter of the Association for Computational Linguistics, 8 pages.
Carter, D., et al., "The Speech-Language Interface in the Spoken Language Translator," Nov. 23, 1994, SRI International, 9 pages.
Chai, J., et al., "Comparative Evaluation of a Natural Language Dialog Based System and a Menu Driven System for Information Access: a Case Study," Apr. 2000, Proceedings of the International Conference on Multimedia Information Retrieval (RIAO), Paris, 11 pages.
Cheyer, A., et al., "Multimodal Maps: An Agent-based Approach," International Conference on Cooperative Multimodal Communication, 1995, 15 pages.
Cheyer, A., et al., "The Open Agent Architecture," Autonomous Agents and Multi-Agent systems, vol. 4, Mar. 1, 2001, 6 pages.
Cheyer, A., et al., "The Open Agent Architecture: Building communities of distributed software agents" Feb. 21, 1998, Artificial Intelligence Center SRI International, Power Point presentation, downloaded from http://www.ai.sri.com/~oaa/, 25 pages.

(56) References Cited

OTHER PUBLICATIONS

Codd, E. F., "Databases: Improving Usability and Responsiveness—'How About Recently'," Copyright © 1978, by Academic Press, Inc., 28 pages.
Cohen, P.R., et al., "An Open Agent Architecture," 1994, 8 pages. http://citeseerx.ist.psu.edu/viewdoc/summary?doi=10.1.1.30.480.
Coles, L. S., et al., "Chemistry Question-Answering," Jun. 1969, SRI International, 15 pages.
Coles, L. S., "Techniques for Information Retrieval Using an Inferential Question-Answering System with Natural-Language Input," Nov. 1972, SRI International, 198 pages.
Coles, L. S., "The Application of Theorem Proving to Information Retrieval," Jan. 1971, SRI International, 21 pages.
Constantinides, P., et al., "A Schema Based Approach to Dialog Control," 1998, Proceedings of the International Conference on Spoken Language Processing, 4 pages.
Craig, J., et al., "Deacon: Direct English Access and Control," Nov. 7-10, 1966 AFIPS Conference Proceedings, vol. 19, San Francisco, 18 pages.
Dar, S., et al., "DTL's DataSpot: Database Exploration Using Plain Language," 1998 Proceedings of the 24th VLDB Conference, New York, 5 pages.
Decker, K., et al., "Designing Behaviors for Information Agents," The Robotics Institute, Carnegie-Mellon University, paper, Jul. 6, 1996, 15 pages.
Decker, K., et al., "Matchmaking and Brokering," The Robotics Institute, Carnegie-Mellon University, paper, May 16, 1996, 19 pages.
Dowding, J., et al., "Gemini: A Natural Language System for Spoken-Language Understanding," 1993, Proceedings of the Thirty-First Annual Meeting of the Association for Computational Linguistics, 8 pages.
Dowding, J., et al., "Interleaving Syntax and Semantics in an Efficient Bottom-Up Parser," 1994, Proceedings of the 32nd Annual Meeting of the Association for Computational Linguistics, 7 pages.
Epstein, M., et al., "Natural Language Access to a Melanoma Data Base," Sep. 1978, SRI International, 7 pages.
Exhibit 1, "Natural Language Interface Using Constrained Intermediate Dictionary of Results," Classes/Subclasses Manually Reviewed for the Search of US Patent No. 7,177,798, Mar. 22, 2013, 1 page.
Exhibit 1, "Natural Language Interface Using Constrained Intermediate Dictionary of Results," List of Publications Manually reviewed for the Search of US Patent No. 7,177,798, Mar. 22, 2013, 1 pages.
Ferguson, G., et al., "TRIPS: An Integrated Intelligent Problem-Solving Assistant," 1998, Proceedings of the Fifteenth National Conference on Artificial Intelligence (AAAI-98) and Tenth Conference on Innovative Applications of Artificial Intelligence (IAAI-98), 7 pages.
Fikes, R., et al., "A Network-based knowledge Representation and its Natural Deduction System," Jul. 1977, SRI International, 43 pages.
Gambäck, B., et al., "The Swedish Core Language Engine," 1992 NOTEX Conference, 17 pages.
Glass, J., et al., "Multilingual Language Generation Across Multiple Domains," Sep. 18-22, 1994, International Conference on Spoken Language Processing, Japan, 5 pages.
Green, C. "The Application of Theorem Proving to Question-Answering Systems," Jun. 1969, SRI Stanford Research Institute, Artificial Intelligence Group, 169 pages.
Gregg, D. G., "DSS Access on the WWW: An Intelligent Agent Prototype," 1998 Proceedings of the Americas Conference on Information Systems-Association for Information Systems, 3 pages.
Grishman, R., "Computational Linguistics: An Introduction," © Cambridge University Press 1986, 172 pages.
Grosz, B. et al., "Dialogic: A Core Natural-Language Processing System," Nov. 9, 1982, SRI International, 17 pages.
Grosz, B. et al., "Research on Natural-Language Processing at SRI," Nov. 1981, SRI International, 21 pages.
Grosz, B., et al., "TEAM: an Experiment in the Design of Transportable Natural-Language Interfaces," Artificial Intelligence, vol. 32, 1987, 71 pages.
Grosz, B., "Team: A Transportable Natural-Language Interface System," 1983, Proceedings of the First Conference on Applied Natural Language Processing, 7 pages.
Guida, G., et al., "NLI: A Robust Interface for Natural Language Person-Machine Communication," Int. J. Man-Machine Studies, vol. 17, 1982, 17 pages.
Guzzoni, D., et al., "Active, A platform for Building Intelligent Software," Computational Intelligence 2006, 5 pages. http://www.informatik.uni-trierde/~ley/pers/hd/g/Guzzoni:Didier.
Guzzoni, D., "Active: A unified platform for building intelligent assistant applications," Oct. 25, 2007, 262 pages.
Guzzoni, D., et al., "Many Robots Make Short Work," 1996 AAAI Robot Contest, SRI International, 9 pages.
Haas, N., et al., "An Approach to Acquiring and Applying Knowledge," Nov. 1980, SRI International, 22 pages.
Hadidi, R., et al., "Students' Acceptance of Web-Based Course Offerings: An Empirical Assessment," 1998 Proceedings of the Americas Conference on Information Systems (AMCIS), 4 pages.
Hawkins, J., et al., "Hierarchical Temporal Memory: Concepts, Theory, and Terminology," Mar. 27, 2007, Numenta, Inc., 20 pages.
He, Q., et al., "Personal Security Agent: KQML-Based PKI," The Robotics Institute, Carnegie-Mellon University, paper, Oct. 1, 1997, 14 pages.
Hendrix, G. et al., "Developing a Natural Language Interface to Complex Data," ACM Transactions on Database Systems, vol. 3, No. 2, Jun. 1978, 43 pages.
Hendrix, G., "Human Engineering for Applied Natural Language Processing," Feb. 1977, SRI International, 27 pages.
Hendrix, G., "Klaus: A System for Managing Information and Computational Resources," Oct. 1980, SRI International, 34 pages.
Hendrix, G., "Lifer: A Natural Language Interface Facility," Dec. 1976, SRI Stanford Research Institute, Artificial Intelligence Center, 9 pages.
Hendrix, G., "Natural-Language Interface," Apr.-Jun. 1982, American Journal of Computational Linguistics, vol. 8, No. 2, 7 pages.
Hendrix, G., "The Lifer Manual: A Guide to Building Practical Natural Language Interfaces," Feb. 1977, SRI International, 76 pages.
Hendrix, G., et al., "Transportable Natural-Language Interfaces to Databases," Apr. 30, 1981, SRI International, 18 pages.
Hirschman, L., et al., "Multi-Site Data Collection and Evaluation in Spoken Language Understanding," 1993, Proceedings of the workshop on Human Language Technology, 6 pages.
Hobbs, J., et al., "Fastus: A System for Extracting Information from Natural-Language Text," Nov. 19, 1992, SRI International, Artificial Intelligence Center, 26 pages.
Hobbs, J., et al.,"Fastus: Extracting Information from Natural-Language Texts," 1992, SRI International, Artificial Intelligence Center, 22 pages.
Hobbs, J., "Sublanguage and Knowledge," Jun. 1984, SRI International, Artificial Intelligence Center, 30 pages.
Hodjat, B., et al., "Iterative Statistical Language Model Generation for Use with an Agent-Oriented Natural Language Interface," vol. 4 of the Proceedings of HCI International 2003, 7 pages.
Huang, X., et al., "The SPHINX-II Speech Recognition System: An Overview," Jan. 15, 1992, Computer, Speech and Language, 14 pages.
Issar, S., et al., "CMU's Robust Spoken Language Understanding System," 1993, Proceedings of Eurospeech, 4 pages.
Issar, S., "Estimation of Language Models for New Spoken Language Applications," Oct. 3-6, 1996, Proceedings of 4th International Conference on Spoken language Processing, Philadelphia, 4 pages.
Janas, J., "The Semantics-Based Natural Language Interface to Relational Databases," © Springer-Verlag Berlin Heidelberg 1986, Germany, 48 pages.
Johnson, J., "A Data Management Strategy for Transportable Natural Language Interfaces," Jun. 1989, doctoral thesis submitted to the Department of Computer Science, University of British Columbia, Canada, 285 pages.
Julia, L., et al., "http://www.speech.Sri.com/demos/atis.html," 1997, Proceedings of AAAI, Spring Symposium, 5 pages.
Kahn, M., et al., "CoABS Grid Scalability Experiments," 2003, Autonomous Agents and Multi-Agent Systems, vol. 7, 8 pages.

(56) References Cited

OTHER PUBLICATIONS

Kamel, M., et al., "A Graph Based Knowledge Retrieval System," © 1990 IEEE, 7 pages.

Katz, B., "Annotating the World Wide Web Using Natural Language," 1997, Proceedings of the 5th RIAO Conference on Computer Assisted Information Searching on the Internet, 7 pages.

Katz, B., "A Three-Step Procedure for Language Generation," Dec. 1980, Massachusetts Institute of Technology, Artificial Intelligence Laboratory, 42 pages.

Kats, B., et al., "Exploiting Lexical Regularities in Designing Natural Language Systems," 1988, Proceedings of the 12th International Conference on Computational Linguistics, Coling'88, Budapest, Hungary, 22 pages.

Katz, B., et al., "REXTOR: A System for Generating Relations from Natural Language," In Proceedings of the ACL Oct. 2000 Workshop on Natural Language Processing and Information Retrieval (NLP &IR), 11 pages.

Katz, B., "Using English for Indexing and Retrieving," 1988 Proceedings of the 1st RIAO Conference on User-Oriented Content-Based Text and Image (RIAO'88), 19 pages.

Konolige, K., "A Framework for a Portable Natural-Language Interface to Large Data Bases," Oct. 12, 1979, SRI International, Artificial Intelligence Center, 54 pages.

Laird, J., et al., "SOAR: An Architecture for General Intelligence," 1987, Artificial Intelligence vol. 33, 64 pages.

Langly, P., et al.,"A Design for the Icarus Architechture," SIGART Bulletin, vol. 2, No. 4, 6 pages.

Larks, "Intelligent Software Agents: Larks," 2006, downloaded on Mar. 15, 2013 from http://www.cs.cmu.edu/larks.html, 2 pages.

Martin, D., et al., "Building Distributed Software Systems with the Open Agent Architecture," Mar. 23-25, 1998, Proceedings of the Third International Conference on the Practical Application of Intelligent Agents and Multi-Agent Technology, 23 pages.

Martin, D., et al., "Development Tools for the Open Agent Architecture," Apr. 1996, Proceedings of the International Conference on the Practical Application of Intelligent Agents and Multi-Agent Technology, 17 pages.

Martin, D., et al., "Information Brokering in an Agent Architecture," Apr. 1997, Proceedings of the second International Conference on the Practical Application of Intelligent Agents and Multi-Agent Technology, 20 pages.

Martin, D., et al., "PAAM '98 Tutorial: Building and Using Practical Agent Applications," 1998, SRI International, 78 pages.

Martin, P., et al., "Transportability and Generality in a Natural-Language Interface System," Aug. 8-12, 1983, Proceedings of the Eight International Joint Conference on Artificial Intelligence, West Germany, 21 pages.

Matiasek, J., et al., "Tamic-P: A System for NL Access to Social Insurance Database," Jun. 17-19, 1999, Proceeding of the 4th International Conference on Applications of Natural Language to Information Systems, Austria, 7 pages.

Michos, S.E., et al., "Towards an adaptive natural language interface to command languages," Natural Language Engineering 2 (3), © 1994 Cambridge University Press, 19 pages.

Milstead, J., et al., "Metadata: Cataloging by Any Other Name . . . " Jan. 1999, ONLINE, Copyright © 1999 Information Today, Inc., 18 pages.

Minker, W., et al., "Hidden Understanding Models for Machine Translation," 1999, Proceedings of ETRW on Interactive Dialogue in Multi-Modal Systems, 4 pages.

Modi, P. J., et al., "CMRadar: A Personal Assistant Agent for Calendar Management," © 2004, American Association for Artificial Intelligence, Intelligent Systems Demonstrations, 2 pages.

Moore, R., et al., "Combining Linguistic and Statistical Knowledge Sources in Natural-Language Processing for ATIS," 1995, SRI International, Artificial Intelligence Center, 4 pages.

Moore, R., "Handling Complex Queries in a Distributed Data Base," Oct. 8, 1979, SRI International, Artificial Intelligence Center, 38 pages.

Moore, R., "Practical Natural-Language Processing by Computer," Oct. 1981, SRI International, Artificial Intelligence Center, 34 pages.

Moore, R., et al., "SRI's Experience with the ATIS Evaluation," Jun. 24-27, 1990, Proceedings of a workshop held at Hidden Valley, Pennsylvania, 4 pages.

Moore, et al., "The Information Warefare Advisor: An Architecture for Interacting with Intelligent Agents Across the Web," Dec. 31, 1998 Proceedings of Americas Conference on Information Systems (AMCIS), 4 pages.

Moore, R., "The Role of Logic in Knowledge Representation and Commonsense Reasoning," Jun. 1982, SRI International, Artificial Intelligence Center, 19 pages.

Moore, R., "Using Natural-Language Knowledge Sources in Speech Recognition," Jan. 1999, SRI International, Artificial Intelligence Center, 24 pages.

Moran, D., et al., "Intelligent Agent-based User Interfaces," Oct. 12-13, 1995, Proceedings of International Workshop on Human Interface Technology, University of Aizu, Japan, 4 pages. http://www.dougmoran.com/dmoran/PAPERS/oaa-iwhit1995.pdf.

Moran, D., "Quantifier Scoping in the SRI Core Language Engine," 1988, Proceedings of the 26th annual meeting on Association for Computational Linguistics, 8 pages.

Motro, A., "Flex: A Tolerant and Cooperative User Interface to Databases," IEEE Transactions on Knowledge and Data Engineering, vol. 2, No. 2, Jun. 1990, 16 pages.

Murveit, H., et al., "Speech Recognition in SRI's Resource Management and ATIS Systems," 1991, Proceedings of the workshop on Speech and Natural Language (HTL'91), 7 pages.

OAA, "The Open Agent Architecture 1.0 Distribution Source Code," Copyright 1999, SRI International, 2 pages.

Odubiyi, J., et al., "SAIRE—a scalable agent-based information retrieval engine," 1997 Proceedings of the First International Conference on Autonomous Agents, 12 pages.

Owei, V., et al., "Natural Language Query Filtration in the Conceptual Query Language," © 1997 IEEE, 11 pages.

Pannu, A., et al., "A Learning Personal Agent for Text Filtering and Notification," 1996, The Robotics Institute School of Computer Science, Carnegie-Mellon University, 12 pages.

Pereira, "Logic for Natural Language Analysis," Jan. 1983, SRI International, Artificial Intelligence Center, 194 pages.

Perrault, C.R., et al., "Natural-Language Interfaces," Aug. 22, 1986, SRI International, 48 pages.

Pulman, S.G., et al., "Clare: A Combined Language and Reasoning Engine," 1993, Proceedings of JFIT Conference, 8 pages. URL: http://www.cam.sri.com/tr/crc042/paper.ps.Z.

Ravishankar, "Efficient Algorithms for Speech Recognition," May 15, 1996, Doctoral Thesis submitted to School of Computer Science, Computer Science Division, Carnegie Mellon University, Pittsburg, 146 pages.

Rayner, M., et al., "Adapting the Core Language Engine to French and Spanish," May 10, 1996, Cornell University Library, 9 pages. http://arxiv.org/abs/cmp-Ig/9605015.

Rayner, M., "Abductive Equivalential Translation and its application to Natural Language Database Interfacing," Sep. 1993 Dissertation paper, SRI International, 163 pages.

Rayner, M., et al., "Deriving Database Queries from Logical Forms by Abductive Definition Expansion," 1992, Proceedings of the Third Conference on Applied Natural Language Processing, ANLC'92, 8 pages.

Rayner, M., "Linguistic Domain Theories: Natural-Language Database Interfacing from First Principles," 1993, SRI International, Cambridge, 11 pages.

Rayner, M., et al., "Spoken Language Translation With Mid-90's Technology: A Case Study," 1993, Eurospeech, ISCA, 4 pages. http://dblp.uni-trier.de/db/conf/interspeech/eurospeech1993.html#RaynerBCCDGKKLPPS93.

Rudnicky, A.I., et al., "Creating Natural Dialogs in the Carnegie Mellon Communicator System,".

Russell, S., et al., "Artificial Intelligence, A Modern Approach," © 1995 Prentice Hall, Inc., 121 pages.

Sacerdoti, E., et al., "A Ladder User's Guide (Revised)," Mar. 1980, SRI International, Artificial Intelligence Center, 39 pages.

(56) References Cited

OTHER PUBLICATIONS

Sagalowicz, D., "A D-Ladder User's Guide," Sep. 1980, SRI International, 42 pages.
Sameshima, Y., et al., "Authorization with security attributes and privilege delegation Access control beyond the ACL," Computer Communications, vol. 20, 1997, 9 pages.
San-Segundo, R., et al., "Confidence Measures for Dialogue Management in the CU Communicator System," Jun. 5-9, 2000, Proceedings of Acoustics, Speech, and Signal Processing (ICASSP'00), 4 pages.
Sato, H., "A Data Model, Knowledge Base, and Natural Language Processing for Sharing a Large Statistical Database," 1989, Statistical and Scientific Database Management, Lecture Notes in Computer Science, vol. 339, 20 pages.
Schnelle, D., "Context Aware Voice User Interfaces for Workflow Support," Aug. 27, 2007, Dissertation paper, 254 pages.
Sharoff, S., et al., "Register-domain Separation as a Methodology for Development of Natural Language Interfaces to Databases," 1999, Proceedings of Human-Computer Interaction (INTERACT'99), 7 pages.
Shimazu, H., et al., "CAPIT: Natural Language Interface Design Tool with Keyword Analyzer and Case-Based Parser," NEC Research & Development, vol. 33, No. 4, Oct. 1992, 11 pages.
Shinkle, L., "Team User's Guide," Nov. 1984, SRI International, Artificial Intelligence Center, 78 pages.
Shklar, L., et al., "Info Harness: Use of Automatically Generated Metadata for Search and Retrieval of Heterogeneous Information," 1995 Proceedings of CAiSE'95, Finland.
Singh, N., "Unifying Heterogeneous Information Models," 1998 Communications of the ACM, 13 pages.
Starr, B., et al., "Knowledge-Intensive Query Processing," May 31, 1998, Proceedings of the 5th KRDB Workshop, Seattle, 6 pages.
Stern, R., et al. "Multiple Approaches to Robust Speech Recognition," 1992, Proceedings of Speech and Natural Language Workshop, 6 pages.
Stickel, "A Nonclausal Connection-Graph Resolution Theorem-Proving Program," 1982, Proceedings of AAAI'82, 5 pages.
Sugumaran, V., "A Distributed Intelligent Agent-Based Spatial Decision Support System," Dec. 31, 1998, Proceedings of the Americas Conference on Information systems (AMCIS), 4 pages.
Sycara, K., et al., "Coordination of Multiple Intelligent Software Agents," International Journal of Cooperative Information Systems (IJCIS), vol. 5, Nos. 2 & 3, Jun. & Sep. 1996, 33 pages.
Sycara, K., et al., "Distributed Intelligent Agents," IEEE Expert, vol. 11, No. 6, Dec. 1996, 32 pages.
Sycara, K., et al., "Dynamic Service Matchmaking Among Agents in Open Information Environments," 1999, SIGMOD Record, 7 pages.
Sycara, K., et al., "The RETSINA MAS Infrastructure," 2003, Autonomous Agents and Multi-Agent Systems, vol. 7, 20 pages.
Tyson, M., et al., "Domain-Independent Task Specification in the TACITUS Natural Language System," May 1990, SRI International, Artificial Intelligence Center, 16 pages.
Wahlster, W., et al., "Smartkonn: multimodal communication with a life-like character," 2001 EUROSPEECH -Scandinavia, 7th European Conference on Speech Communication and Technology, 5 pages.
Waldinger, R., et al., "Deductive Question Answering from Multiple Resources," 2003, New Directions in Question Answering, published by AAAI, Menlo Park, 22 pages.
Walker, D., et al., "Natural Language Access to Medical Text," Mar. 1981, SRI International, Artificial Intelligence Center, 23 pages.
Waltz, D., "An English Language Question Answering System for a Large Relational Database," © 1978 ACM, vol. 21, No. 7, 14 pages.
Ward, W., et al., "A Class Based Language Model for Speech Recognition," © 1996 IEEE, 3 pages.
Ward, W., et al., "Recent Improvements in the CMU Spoken Language Understanding System," 1994, ARPA Human Language Technology Workshop, 4 pages.
Ward, W., "The CMU Air Travel Information Service: Understanding Spontaneous Speech," 3 pages.
Warren, D.H.D., et al., "An Efficient Easily Adaptable System for Interpreting Natural Language Queries," Jul.-Dec. 1982, American Journal of Computational Linguistics, vol. 8, No. 3-4, 11 pages.
Weizenbaum, J., "ELIZA—A Computer Program for the Study of Natural Language Communication Between Man and Machine," Communications of the ACM, vol. 9, No. 1, Jan. 1966, 10 pages.
Winiwarter, W., "Adaptive Natural Language Interfaces to FAQ Knowledge Bases," Jun. 17-19, 1999, Proceedings of 4th International Conference on Applications of Natural Language to Information Systems, Austria, 22 pages.
Wu, X. et al., "KDA: A Knowledge-based Database Assistant," Data Engineering, Feb. 6-10, 1989, Proceeding of the Fifth International Conference on Engineering (IEEE Cat. No. 89CH2695-5), 8 pages.
Yang, J., et al., "Smart Sight: A Tourist Assistant System," 1999 Proceedings of Third International Symposium on Wearable Computers, 6 pages.
Zeng, D., et al., "Cooperative Intelligent Software Agents," The Robotics Institute, Carnegie-Mellon University, Mar. 1995, 13 pages.
Zhao, L., "Intelligent Agents for Flexible Workflow Systems," Oct. 31, 1998 Proceedings of the Americas Conference on Information Systems (AMCIS), 4 pages.
Zue, V., et al., "From Interface to Content: Translingual Access and Delivery of On-Line Information," 1997, Eurospeech, 4 pages.
Zue, V., et al., "Jupiter: A Telephone-Based Conversational Interface for Weather Information," Jan. 2000, IEEE Transactions on Speech and Audio Processing, 13 pages.
Zue, V., et al., "Pegasus: A Spoken Dialogue Interface for On-Line Air Travel Planning," 1994 Elsevier, Speech Communication 15 (1994), 10 pages.
Zue, V., et al., "The Voyager Speech Understanding System: Preliminary Development and Evaluation," 1990, Proceedings of IEEE 1990 International Conference on Acoustics, Speech, and Signal Processing, 4 pages.

\* cited by examiner

SEMANTIC SEARCH USING A SINGLE-SOURCE SEMANTIC MODEL

BACKGROUND OF THE INVENTION

In the field of information retrieval, semantic search techniques have been used to build a semantic model from a set of documents (webpages, emails, or documents on a file system, for example), and given a search query, find the set of documents that best relate to that query. The conventional method has been to build an inverted index of all words in a document across all documents, and then using various relevancy metrics, compare the words of the search query (assumed to be another kind of document) against the index, and finding a ranked set of files that are 'closest' to the query. In practice, this serves to simulate semantic search because words that represent a semantic concept tend to cluster together in co-occurrences.

Early methods involved techniques such as Latent Semantic Analysis to calculate the singular value decomposition (SVD) of a matrix derived from the inverted document-word index. For reasonable accuracy, one must specify the k number of dimensions in the Eigen decomposition ahead of time, which can dramatically affect overall search results. More recent approaches, based on principled probabilistic models that bypass the resource intensive SVD computation, including probabilistic latent semantic analysis (PLSA) and ranking support vector machines (SVMs), accomplish the same task, but also require that the number of concepts be known at training time.

While this works quite well in limited domains (such as spam-mail filtering), it proves infeasible for full-fledged desktop search. This is typically due to: a) the user has few or no files to create an index, leading to sparsity of data, and therefore sub-optimal searches; b) the user has hundreds of gigabytes of data, leading to huge indexes and inexcusable computation times when building the model; or c) even with a reasonable index size, it can be difficult finding the optimal k parameter for each individual dataset.

SUMMARY

In accordance with some implementations, a method is provided for semantic searching using a single-source semantic model. The method may be performed at an electronic device with one or more processors and memory. The method includes determining a similarity metric of a document comprising a data store to a concept represented in a semantic model. The semantic model is derived at least in part from a reference source that includes content not included in the data store. The method further includes computing a relevance metric of a search query to the concept. For example, the semantic model is used to compute a degree to which the query terms are relevant to one or more concepts comprising the semantic model. The method further includes using the similarity metric and the relevance metric to determine, at least in part, a ranking of the document with respect to the search query.

In some implementations, the method includes using the reference source to build the semantic model.

In some implementations, the reference source comprises a body of content containing items representing a wide range of concepts.

In some implementations, determining the similarity metric includes embedding the document in the semantic model. In some implementations, computing the relevance metric includes embedding the search query in the semantic model.

In accordance with some implementations, a system including a processor is provided. The processor is configured to determine a similarity metric of a document comprising a data store to a concept represented in a semantic model. The semantic model is derived at least in part from a reference source that includes content not included in the data store. The processor is further configured to compute a relevance metric of a search query to the concept. For example, the semantic model is used to compute a degree to which the query terms are relevant to one or more concepts comprising the semantic model. The processor is further configured to use the similarity metric and the relevance metric to determine, at least in part, a ranking of the document with respect to the search query.

In accordance with some implementations, a computer program product is provided, the computer program product being embodied in a tangible, non-transitory computer readable storage medium. The computer program product includes instructions for determining a similarity metric of a document comprising a data store to a concept represented in a semantic model. The semantic model is derived at least in part from a reference source that includes content not included in the data store. The computer program product further includes instructions for computing a relevance metric of a search query to the concept. For example, the semantic model is used to compute a degree to which the query terms are relevant to one or more concepts comprising the semantic model. The computer program product further includes instructions for using the similarity metric and the relevance metric to determine, at least in part, a ranking of the document with respect to the search query.

BRIEF DESCRIPTION OF THE DRAWINGS

Various embodiments of the invention are disclosed in the following detailed description and the accompanying drawings.

DETAILED DESCRIPTION

Figure 1:
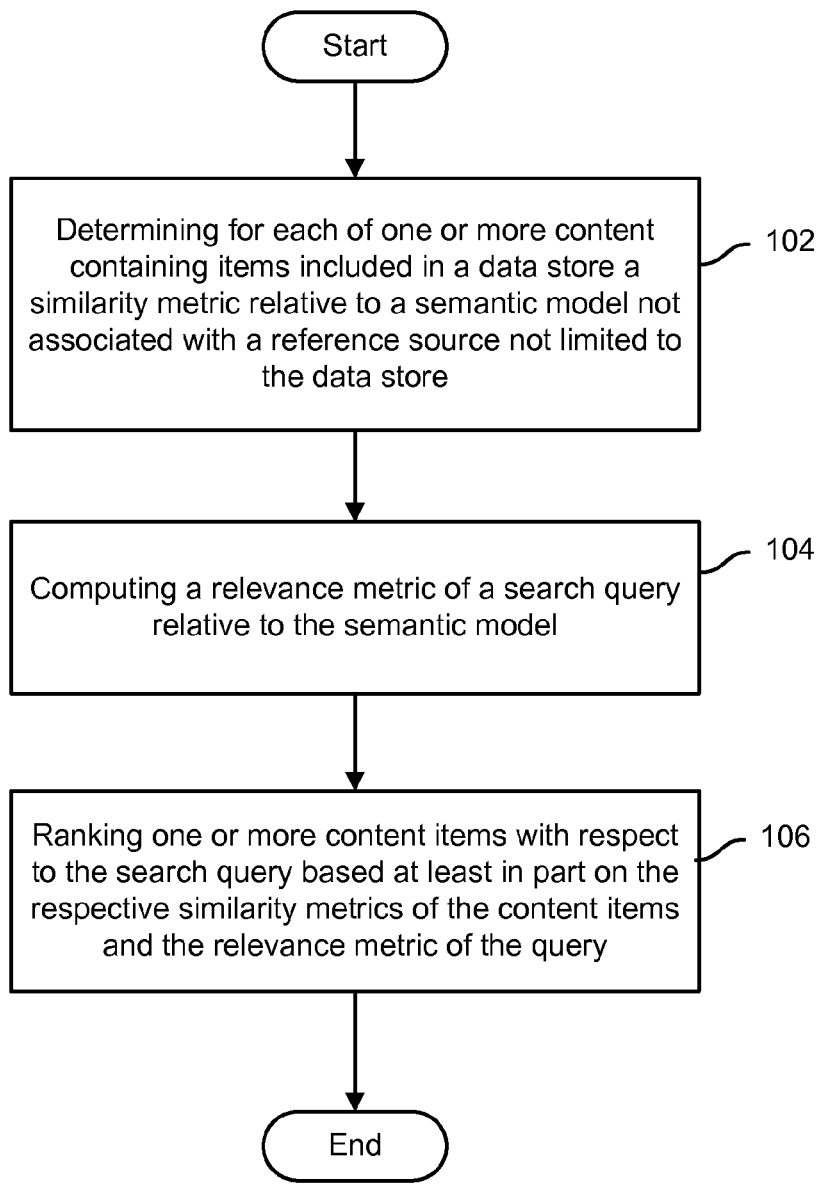
FIG. 1 is a flow chart illustrating an embodiment of a process to search a data store.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Providing semantic search using a single-source semantic model across data stores is disclosed. In various embodiments, a reference source of data is used to build a semantic space. Example reference sources include, without limitation, Wikipedia or other sources of rich, modern concepts that are sorted by concept type (Articles) and even sub-concepts of concepts (Headings within Articles). Wikipedia also has the advantage of being available in a number of languages other than English, allowing us to provide multilingual semantic searches. With a single model, the similarities of a user's documents are computed against the semantic model and those values are stored, to be accessed at search time. When the user enters a search query, and after some appropriate pre-processing (such as query expansion, or augmenting the query with related terms), the query is compared against the model to find the c ranked set of concepts relevant to the query, and from those, the user documents that are closely related to the query (i.e., to the same concepts which have been determined to be relevant to the query) are determined.

FIG. 1 is a flow chart illustrating an embodiment of a process to search a data store. For each of one or more content containing items, such as documents or other files, comprising a data store, a similarity metric relative to a semantic model built at least in part using a reference source external to the data store is determined (102). For example, the similarity of each of a plurality of documents or other content containing items to documents, concepts, etc. comprising a semantic model built using a broad-based reference source, such as Wikipedia or another world knowledge store, may be determined. The determination is made in various embodiments prior to a time when a search query is received and processed. Similarity values are computed in some embodiments by embedding documents comprising the data store into the semantic model, e.g., as described more fully below, and the similarity values are stored for use at search query processing time. A search query is received, and a relevance metric of the search query to documents, concepts, etc. comprising the semantic model is computed (104). The similarity metric values associated with the respective content containing items in the data store and the relevance metric computed for the search query are used to identify and rank content containing items within the data store (106). In various embodiments, this approach enables content containing items within the data store that are the most similar to those concepts, documents, etc. within the semantic model that have been determined to be most relevant to the search query that is being processed to be identified and ranked based at least in part on their respective degree of similarity to those concepts, etc.

Figure 2:
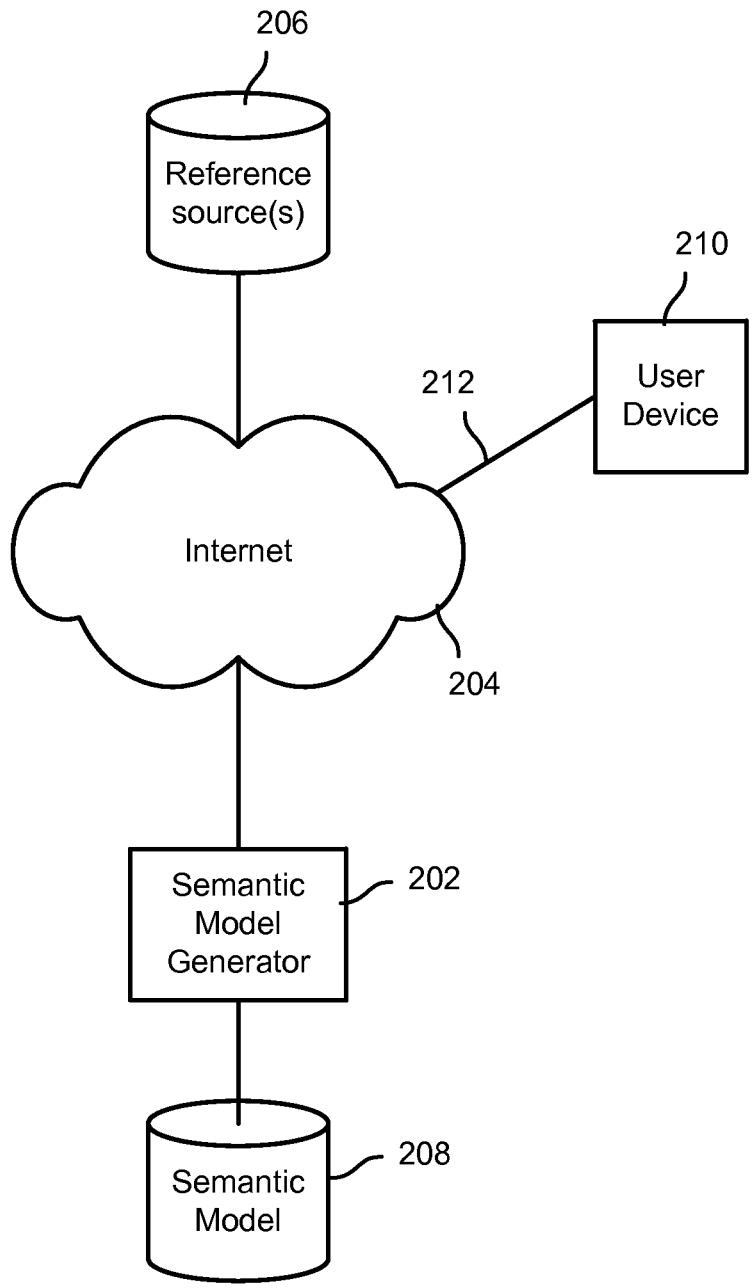
FIG. 2 is a block diagram illustrating an embodiment of a system to perform semantic search.

FIG. 2 is a block diagram illustrating an embodiment of a system to perform semantic search. In the example shown, a semantic model generator system 202, such as a computer, is connected via the Internet 204 to one or more reference source(s) 206, such as the body of articles comprising the Wikipedia in a given language, and/or one or more other reference sources. The semantic model generator system 202 ingests and processes documents comprising the reference source to build a semantic model, for example using latent semantic analysis and/or associated techniques, based on the reference source. The semantic model is store in a semantic model database 208. In the example shown, a user device 210, such as a desktop or portable computer, a mobile smartphone, tablet computer, or other mobile device, is connected to the Internet 204 via a wired and/or wireless connection 212. In various embodiments, a data store comprising and/or otherwise associated with user device 210 is processed. Examples include, without limitation, documents and/or other content items stored on the user device, such as in a file system; application data objects, such as emails, calendar items, contacts, etc.; and user device vendor and/or software provider provided content, such as help articles. In some embodiments, the semantic model generator 202 embeds content containing items from the user device into the semantic model built using the reference source(s) 206 and computes the similarity of each content item to concepts represented in/by the semantic model. In some embodiments, the resulting semantic model (i.e., now incorporating the user device data store content items) is stored on the user device 210 and used at search query processing time to process search queries. In some embodiments, the model is stored in the semantic model database 208 and search queries are processed by accessing the model at runtime via the Internet 204. In various embodiments, the user device 210 is configured to use the semantic model to process search queries, for example by using the semantic model to compute a degree to which the query terms are relevant to one or more concepts comprising the semantic model and in turn using the semantic model to identify and rank content items in the user device's data store that are most similar to the concepts to which the query has been determined to be relevant. Examples of search queries include without limitation desktop (or other device content) search queries, help topic search queries, etc.

Figure 3:
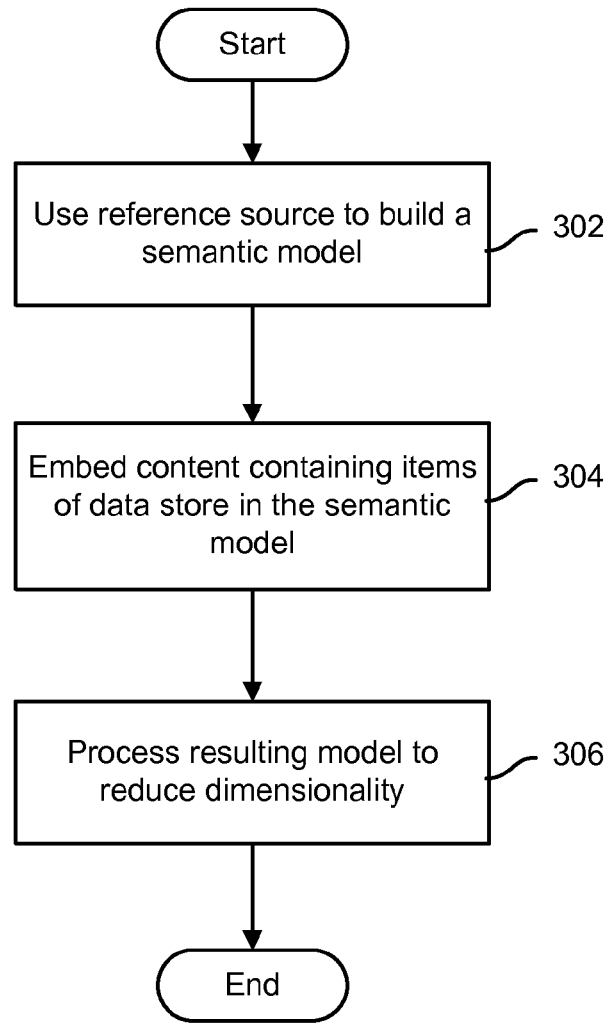
FIG. 3 is a flow diagram illustrating an embodiment of a process to build a semantic model.

FIG. 3 is a flow diagram illustrating an embodiment of a process to build a semantic model. In the example shown, a reference source that encompasses a wide range of human knowledge, such as Wikipedia, or another online reference source, is used to build a semantic model (302). For example, Wikipedia articles and/or portions thereof in some embodiments are processed to populate columns in a term frequency matrix such as those commonly used to perform latent semantic analysis. Content containing items, such as documents, comprising a user device or other data store are embedded into the semantic model (304). For example, documents stored on the user device may be processed similarly to articles comprising the reference source, each being added as a column to the matrix described above. The SVD and/or other transforms may be performed (306) to reduce the dimensionality (i.e., size and complexity) of the matrix while preserving the concept similarity relationships among documents represented in the model. In some embodiments, the value of optimal k will depend on the analysis of the reference data which is used to train the model. One can relate the value of k to the detail in which the user expects the results. A lower k value will provide very product concepts that may overlap, while a higher k may provide too much detail that may compromise the larger context to be determined.

Figure 4:
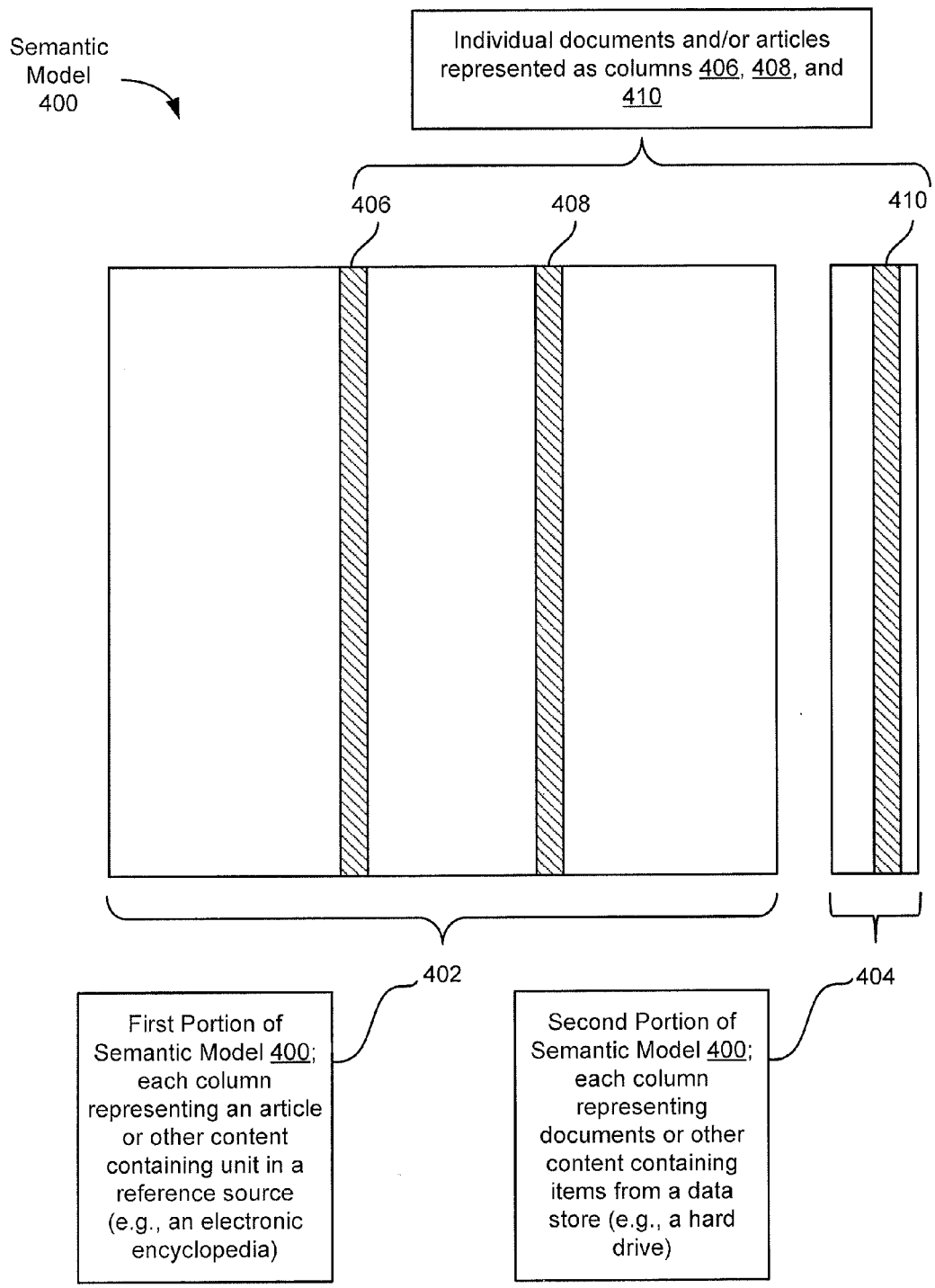
FIG. 4 is a block diagram illustrating an embodiment of a semantic model.

FIG. 4 is a block diagram illustrating an embodiment of a semantic model. In the example shown, the semantic model 400 includes a first portion 402 comprising columns each representing an article or other content containing unit included in a reference source, such as Wikipedia, and a second portion 404 representing documents or other content containing items from a data store, such as file system objects on a user device. Individual portions (e.g., documents) are represented as columns, such as columns 406 and 408 in portion 402 and column 410 in portion 404. (The width of the columns 406, 408, 410 relative to the portions 402, 404 as shown in FIG. 4 is exaggerated for clarity.) While the portions 402 and 404 are shown as being separate contiguous portions of model 400, in some embodiments, documents comprising the data store may be interspersed among articles from the reference source, for example as a result of mathematical transformations performed to facilitate runtime performance and/or as a result of semantic relationships between documents from the data store and articles (or other content units) from the reference source.

In some embodiments, the multi-lingual nature of Internet-based references, such as Wikipedia, allows locale-dependent semantic searches to be enabled. For example, if the local data store is (primarily) in French, one could find the semantic relevance to the models stored using French data stores. In some embodiments, one could use a language identification system to determine the locale for the query or let the user specify the locale as a part of the input string. The locale determined is then used to reference the appropriate semantic model.

The approach disclosed herein enables latent semantic analysis techniques to be used to relate documents comprising a data store—in which only a limited number of concepts, the number and names of which may not be known in advance or easily determined, may be represented explicitly—to concepts represented in the reference source but not explicitly represented in the data store. For example, using the approach described herein user device documents relating to the subject of soccer (for example, 410 in FIG. 4) may be found to be responsive to a search query using terms such as "sports" or even "tennis" based on the previously determined similarity of those documents to "sports" and "tennis" related articles in the reference source (for example 406 and/or 408 of FIG. 4), even if the relationship between the soccer-related documents and the concepts of "sports" generally or other sports such as "tennis" may not have been determined and/or as readily apparent if latent semantic processing techniques had been applied to documents comprising the data store in isolation. In another example, the query "French war movies" may reference war movies included in the local data store, and may include concepts such as "war movies about France" or "French movies about wars" or "war movies in the local data store."

In various embodiments, techniques disclosed herein are used to provide semantic search capability with respect to a defined body of content, using a semantic model based on content not limited to that defined body of content. Examples include, without limitation, searching a local file system or portion thereof (e.g., directory, subdirectory, folder, etc.); searching for emails (Mail); searching iChat discussions by topic; and searching a user's songs by lyric meaning or concepts expressed in the lyrics (for example, using as a reference model the entire iTunes or another music catalog, but the search would be for songs on a user's device, including potentially songs that might not be known to iTunes).

In various embodiments, the same reference source and resulting base semantic model (prior to embedding user or other content) is used to provide semantic search functionality with respect to the respective data stores of a plurality of distinct users and/or for a single user across multiple data stores, for example across multiple user devices each have a subset of the user's documents or other data containing objects stored thereon. Using the same core semantic model across users and/or devices enables a more uniform semantic search experience to be provided across users and/or devices, since regardless of the quantity and/or nature of the content on a particular user device (or other data store), the content items comprising the data store to be searched at search time are related as disclosed herein to concepts represented in a common semantic model based on the reference source.

In some embodiments, the core semantic model may be updated from time to time, for example to incorporate additions or other change to the reference source, such as articles added to the reference source and describing subject matter not included previously in the reference source, such as a recent major world event or an emerging world leader or other public figure. In some embodiments, the updated core semantic model is used to update (for example, regenerate) the user and/or device specific models generated based thereon. For example, user content, which also evolves over time, may be embedded in the updated core semantic model based on the reference source, and new similarity metrics computed for the user documents or other content containing items.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   providing a data store including documents;
   providing a semantic model including a plurality of concepts, wherein the semantic model is derived at least in part from a reference source that includes content not included in the data store;
   determining at least one similarity metric for each document of the plurality of documents, wherein each respective similarity metric represents a similarity between a respective document of the plurality of documents and a respective concept of the plurality of concepts in the semantic model;
   receiving a search query;
   computing at least one relevance metric of the search query, wherein each relevance metric represents a relevance of the search query to a respective concept of the plurality of concepts represented in the semantic model; and
   determining a ranking of at least a subset of the plurality of documents with respect to the search query using at least the at least one similarity metric and the at least one relevance metric.

2. The method of claim 1, further comprising using the reference source to build the semantic model.

3. The method of claim 1, further comprising using the semantic model to provide semantic search functionality with respect to a plurality of data stores.

4. The method of claim 1, wherein the reference source comprises a body of content containing items representing a wide range of concepts.

5. The method of claim 1, wherein the reference source comprises an online source of articles on a wide range of subjects.

6. The method of claim 1, wherein the semantic model is stored on a user device.

7. The method of claim 1, wherein determining the at least one similarity metric for each document of the plurality of documents includes embedding each document of the plurality of documents in the semantic model.

8. The method of claim 1, wherein computing the at least one relevance metric includes embedding the search query in the semantic model.

9. The method of claim 1, wherein the data store comprises at least a portion of a file system.

10. The method of claim 1, wherein the data store comprises a set of help topic, product or system knowledge base, or other limited domain articles.

11. A system, comprising:
a processor configured to:
provide a data store including a plurality of documents;
provide a semantic model including a plurality of concepts, wherein the semantic model is derived at least in part from a reference source that includes content not included in the data store;
determine at least one similarity metric for each document of the plurality of documents, wherein each respective similarity metric represents a similarity between a respective document of the plurality of documents and a respective concept of the plurality of concepts in the semantic model;
receive a search query;
compute at least one relevance metric of the search query, wherein each relevance metric represents a relevance of the search query to a respective concept of the plurality of concepts represented in the semantic model; and
determine a ranking of at least a subset of the plurality of documents with respect to the search query using at least the at least one similarity metric and the at least one relevance metric; and memory coupled to the processor and configured to store the semantic model.

12. The system of claim 11, wherein the semantic model is stored on the system.

13. The system of claim 11, wherein determining the at least one similarity metric for each document of the plurality of documents includes embedding each document of the plurality of documents in the semantic model.

14. The system of claim 11, wherein computing the at least one relevance metric includes embedding the search query in the semantic model.

15. A computer program product, the computer program product being embodied in a tangible, non-transitory computer readable storage medium and comprising computer instructions for:
providing a data store including a plurality of documents;
providing a semantic model including a plurality of concepts, wherein the semantic model is derived at least in part from a reference source that includes content not included in the data store;
determining at least one similarity metric for each document of the plurality of documents wherein each respective similarity metric represents a similarity between a respective document of the plurality of documents and a respective concept of the plurality of concepts in the semantic model;
receiving a search query;
computing at least one relevance metric of the search query, wherein each relevance metric represents a relevance of the search query to a respective concept of the plurality of concepts represented in the semantic model; and
determining a ranking of at least a subset of the plurality of documents with respect to the search query using at least the at least one similarity metric and the at least one relevance metric.

16. The computer program product of claim 15, further comprising computer instructions for using the reference source to build the semantic model.

17. The computer program product of claim 15, wherein determining the at least one similarity metric for each document of the plurality of documents includes embedding each document of the plurality of documents in the semantic model.

18. The method of claim 5, wherein the reference source is Wikipedia.

* * * * *